(12) United States Patent
Blondeel et al.

(10) Patent No.: US 8,609,174 B2
(45) Date of Patent: Dec. 17, 2013

(54) METHOD FOR PRODUCING A SOLUBLE COCOA PRODUCT FROM COCOA POWDER

(75) Inventors: Ieme Blondeel, Lebbeke-wieze (BE); Dirk De Clercq, Lebbeke-wieze (BE); Herwig Bernaert, Lebbeke-wieze (BE); Christophe Leclerc, Lebbeke-wieze (BE)

(73) Assignee: Barry Callebaut AG, Zurich (CH)

( * ) Notice: Subject to any disclaimer, the term of this patent is extended or adjusted under 35 U.S.C. 154(b) by 303 days.

(21) Appl. No.: 12/430,732

(22) Filed: Apr. 27, 2009

(65) Prior Publication Data

US 2009/0263556 A1 Oct. 22, 2009

Related U.S. Application Data

(63) Continuation-in-part of application No. PCT/EP2007/062486, filed on Nov. 19, 2007, and a continuation-in-part of application No. PCT/EP2009/053689, filed on Mar. 27, 2009, and a continuation-in-part of application No. PCT/EP2008/055269, filed on Apr. 29, 2008, and a continuation-in-part of application No. PCT/EP2009/055060, filed on Apr. 27, 2009.

(51) Int. Cl.
*A23L 2/38* (2006.01)
*A23G 1/00* (2006.01)

(52) U.S. Cl.
USPC .............................. 426/593; 426/44; 426/631

(58) Field of Classification Search
USPC ........................................... 426/44, 593, 631
See application file for complete search history.

(56) References Cited

U.S. PATENT DOCUMENTS

| | | | |
|---|---|---|---|
| 2,380,158 A | 10/1942 | Durrenmatt et al. | |
| 2,687,959 A | 8/1954 | Siehrs | |
| 2,954,293 A | 9/1960 | Rusoff | |
| 2,977,231 A | 3/1961 | Fox et al. | |
| 3,615,659 A | 10/1971 | Weber | |
| 3,784,715 A | 1/1974 | Arden | |
| 3,982,042 A | 9/1976 | Arden | |
| 4,497,841 A * | 2/1985 | Wudel et al. | 426/565 |
| 4,704,292 A * | 11/1987 | Kattenberg | 426/565 |
| 4,776,173 A | 10/1988 | Kamarei et al. | |
| 4,784,866 A | 11/1988 | Wissgott | |
| 4,871,562 A | 10/1989 | Terauchi et al. | |
| 5,338,554 A | 8/1994 | Vogt et al. | |
| 6,514,555 B1 * | 2/2003 | Fayard et al. | 426/565 |
| 6,517,841 B2 * | 2/2003 | Romanczyk et al. | 424/776 |
| 6,790,966 B2 * | 9/2004 | Romanczyk et al. | 549/354 |
| 7,340,990 B2 | 3/2008 | Halliday et al. | |
| 7,368,144 B2 * | 5/2008 | Lecoupeau et al. | 426/655 |
| 7,919,135 B2 | 4/2011 | Nair et al. | |
| 2002/0061355 A1 * | 5/2002 | Martin et al. | 426/565 |
| 2004/0005347 A1 * | 1/2004 | Ter Laak et al. | 424/440 |
| 2004/0096566 A1 * | 5/2004 | Lecoupeau et al. | 426/593 |
| 2004/0202761 A1 | 10/2004 | Kochar et al. | |
| 2005/0074521 A1 * | 4/2005 | Bartnick et al. | 426/49 |
| 2007/0042101 A1 | 2/2007 | Troplin et al. | |
| 2007/0077318 A1 | 4/2007 | Pons-Andreu et al. | |
| 2008/0038409 A1 | 2/2008 | Nair et al. | |
| 2008/0193629 A1 | 8/2008 | Pons-Andreu et al. | |
| 2010/0062138 A1 * | 3/2010 | Cienfuegos-Jovellanos Fernandez et al. | 426/631 |
| 2010/0130422 A1 * | 5/2010 | Bernaert et al. | 514/12 |
| 2010/0184666 A1 * | 7/2010 | Bernaert et al. | 514/12 |
| 2010/0189829 A1 * | 7/2010 | Bernaert et al. | 424/776 |
| 2011/0293789 A1 | 12/2011 | Blondeel et al. | |
| 2012/0003355 A1 | 1/2012 | Bernaert et al. | |

FOREIGN PATENT DOCUMENTS

| | | |
|---|---|---|
| CH | 230897 | 2/1944 |
| CH | 679629 | 3/1992 |
| CN | 1483472 | 3/2004 |
| DE | 2342177 | 7/1974 |
| GB | 797147 | 6/1958 |
| GB | 2182538 | 5/1987 |
| JP | 4942840 | 4/1974 |
| JP | 55120748 | 9/1980 |
| JP | 62272941 | 11/1987 |
| JP | 11308978 | 11/1999 |

(Continued)

OTHER PUBLICATIONS

J Agric Food Chem. 2007 55:3926.*

(Continued)

*Primary Examiner* — Carolyn Paden
(74) *Attorney, Agent, or Firm* — Hoxie & Associates LLC

(57) ABSTRACT

The present invention relates to a method for producing a soluble cocoa product from cocoa powder. The present invention further relates to cocoa products obtained by the present method and uses thereof. The present invention is also directed to a cocoa-derived material comprising a soluble cocoa powder and a cocoa extract, wherein said extract comprises more than 25 wt % based on the extract of polyphenols. The cocoa-derived material can be a syrup, a ready to use beverage or a powder composition. The invention also relates to uses of this cocoa-derived material for preparing carbonated beverages containing cocoa. The invention further relates to a carbonated beverage comprising said cocoa-derived material and to methods for preparing such cocoa-derived materials and beverages. The invention also provides an ice cream comprising a cocoa powder, and in particular to an ice cream comprising up to 15 wt % of a soluble cocoa powder, wherein said cocoa powder has a solubility in water of at least 50% at a temperature of less than 10° C. The invention further relates to a method for preparing such ice cream and the use thereof in food products.

15 Claims, 4 Drawing Sheets

(56) References Cited

FOREIGN PATENT DOCUMENTS

| | | | |
|---|---|---|---|
| JP | 2000125767 | | 5/2000 |
| JP | 20022153213 | | 5/2002 |
| WO | WO 96/10404 | | 4/1996 |
| WO | WO 97/36497 | | 10/1997 |
| WO | WO 98/09533 | | 3/1998 |
| WO | WO 99/45788 | | 9/1999 |
| WO | WO 01/93690 | | 12/2001 |
| WO | WO 2004/096566 | | 11/2004 |
| WO | WO 2007002851 | | 1/2007 |
| WO | WO 2007002883 | | 1/2007 |
| WO | WO 2007106473 | | 9/2007 |
| WO | WO 2008/059064 | * | 5/2008 |
| WO | WO 2008059064 | | 5/2008 |
| WO | WO 2009/118418 | | 10/2009 |
| WO | WO 2009/133067 | | 11/2009 |

OTHER PUBLICATIONS

Feng, P. et al., "Health Care Products for Delaying Senility, Comprises Cleaning Spiny Pear, Mashing, Using Juicer and Filtering, Freeze-Drying or Spray-Drying or Vacuum Dring or Microwave Drying Filtrate to Obtain Spiny Pear Powder", (2004), XP002445704, p. 1.

Mullin, W.J., et al., "The Macronutrient Content of Fractions from Jerusalem Artichoke Tubers (*Helianthus tuberosus*)", Food Chemistry, (1994), vol. 51, No. 3, XP002445702, pp. 1-2.

BIOSIS abstract, PREV199497494956, XP-002445702; The macronutrient content of fractions from Jerusalem artichoke tubers (*Helianthus tuberosus*), 1994.

Bonvchi, Investigation of aromatic compounds in roasted cocoa powder, Eur. Food Res. Technol 221:19-29 (2005).

Cacao Et Chocolat—Production Utilisation Caracteristiques, Pontillon (ed), pp. 110-113, 270-273, and 315; Dec. 1997.

Handbuch der Kakaoerzeugnisse, 2nd ed., Fincke (ed.), Springer-Verlag Berlin/Heidelberg/New York, 1965.

Miller et al., Impact of Alkalization on the Antioxidant and Flavanol Content of Commercial Cocoa Powders, J. Agric. Food Chem., 56:8527-8533 (2008).

Talcott et al., Red clover isoflavonoids as anthocyanin color enhancing agents in muscadine wine and juice, Food Research International 38(10)-1205-12 (2005).

WPI abstract of CN1483472; XP-002445704, 2004.

Scherz H et al., Kakaopulver—Cocoa Powder Cacao en poudre, Food compositions and Nutritional Tables, Jan. 1, 2000, XP 002475567.

* cited by examiner

METHOD FOR PRODUCING A SOLUBLE COCOA PRODUCT FROM COCOA POWDER

This patent application is a continuation-in-part (CIP) of: (1) International application PCT/EP2007/062486, filed on Nov. 19, 2007, which claims the benefit of PCT/EP2006/011050, filed Nov. 17, 2006, and PCT/EP2007/056258, filed Jun. 22, 2007; (2) PCT/EP2009/053689, filed Mar. 27, 2009, which claims the benefit of PCT/EP2008/053740, filed Mar. 28, 2008; (3) PCT/EP2008/055269, filed Apr. 29, 2008; and (4) PCT/EP2009/055060, filed Apr. 27, 2009, which applications are all hereby expressly incorporated by reference in its entirety for all purposes.

TECHNICAL FIELD

The present invention relates to a method for producing a soluble cocoa product from cocoa powder. The invention also relates to a soluble cocoa product having improved solubility that can be obtained by applying the present method and various uses thereof, e.g. in a beverage pouch, for preparing a beverage containing cocoa, for preparing ice creams, etc., for preparing ice creams The present invention further relates to a cocoa-derived material comprising a soluble cocoa powder and a cocoa extract having an elevated amount of cocoa polyphenols. The invention also relates to the use of such cocoa-derived material for preparing a beverage or drink containing cocoa, preferably a carbonated beverage or drink. The present method further discloses methods for preparing a cocoa-derived material and beverage as defined herein.

In addition, the invention relates to an ice cream comprising a soluble cocoa powder, to a process for preparing such ice cream and to the application thereof in food products.

BACKGROUND

Cocoa powder is known in the art as the product prepared from cacao nibs, which have been dried and ground after the extraction of cocoa butter. A starting material in the preparation of cocoa powder is cocoa beans which are fermented, dried, roasted and cracked. The nibs—the center of the cocoa bean—are ground into a dark brown paste known as cocoa liquor. This paste is pressed into cocoa cakes by removing most of the cocoa butter. The hard cocoa cakes are ground into cocoa powder. Depending on the amount of cocoa butter earlier removed, the fat content of cocoa powder can be adjusted.

Cocoa powder is used in the preparation of food stuffs such as baked products, beverages, and confectionary. One major use, for example, is in beverages including drinking chocolate, chocolate-flavored milk, and instant drinks from vending machines and other sources. In these applications, ideally the powder should instantly disperse when mixed with a cold aqueous medium such as milk or water. However, cocoa powder is not easily wetted which can impede dispersion and result in lumping. Thus, when cocoa powder is dispersed in milk or water to prepare a beverage, the physical properties of obtained beverages are often below consumers' appreciation. The difficulty is exacerbated if the powder contains fat, such as residual cocoa butter, or if the dispersion is to take place in a cold liquid.

A problem is that currently available cocoa powders, when dissolved in liquids such as water or milk, do not provide beverages having satisfying organoleptic properties, especially color, taste, nutritional values. Another problem is that large amounts of cocoa powder need to be used in order to obtain tasty drinks.

Therefore, processes have been developed for extracting only the soluble elements from the powder. Examples of processes are described in U.S. Pat. No. 3,615,659 and U.S. Pat. No. 5,338,554 which use organic treatment or enzymes.

U.S. Pat. No. 3,615,659 for instance describes a process for producing a chocolate-flavored beverage which comprises the steps of 1) extracting cocoa with water at a temperature of below 80° C., 2) heating the extract to a temperature between 110 and 130° C., 3) subsequent cooling to 20 to 5° C. in order to precipitate insoluble substances, and 4) separating insoluble substances and sterilizing the beverage. The process includes the addition of a starch-degrading enzyme to the cocoa-water mixture in order to increase the yield.

U.S. Pat. No. 5,338,554 discloses a process for producing a soluble cocoa product wherein cocoa powder is subjected to an extraction with alcohol, and from the residue a water extract is prepared. The residue of the alcohol extraction can be subjected to an enzyme treatment in order to increase the subsequent water extraction. This water extract is concentrated to a soluble cocoa product.

A problem with these methods is the large amount of insoluble material still remaining after extraction and a poor taste. Commonly 75% of cocoa powder is found insoluble in water, meaning only 25% of cocoa powder is found as useful soluble components. After enzymatic treatment, the amount of soluble material of the cocoa powder can be increased to about 40%, meaning 40% of the initial cocoa powder is obtained as useful soluble components. However, this remains insufficient for certain applications. Furthermore, the use of organic solvents described in prior art techniques may change the properties and natural taste of the resulting soluble cocoa.

The invention relates to a method for increasing solubilisation of cocoa powder and thus for increasing the amount of soluble cocoa components in a cocoa powder. More in particular, the present invention aims to increase the amount of soluble cocoa components that can be obtained or extracted from a cocoa powder. The present invention also aims to reduce the amount of insoluble material that remains after extraction from cocoa powder. The present invention also aims to provide a more efficient method to render cocoa powder more water soluble.

The present invention further aims to provide cocoa powder having improved solubility together with excellent organoleptic properties and excellent properties, including elevated protein content, a lower theobromine and/or a lower caffeine content relevant for various applications.

The present invention also aims to provide cocoa-derived materials and cocoa-derived beverages which have satisfying organoleptic properties and nutritive value and are relatively easy to prepare.

The use of cocoa-derived material in ice cream has been reported in the art. For instance, prior art documents are known which report the addition of cocoa powder to ice cream for flavoring purposes. Also the use of cocoa extracts in ice cream has been reported, for instance in U.S. Pat. No. 5,338,554. However, use of a cocoa extract has the disadvantage of not providing a suitable flavour and taste.

In the field of ice creams, the way in which ice cream behaves on exposure to normal room temperature is important from a consumer point of view. If a product behaves too atypically, for instance if a product melts too rapidly or separates into a fatty phase and a clear aqueous phase on melting, then the product will be unacceptable. In the ice cream industry methods have been developed for measuring such stability properties, for instance melt-down and stand-up characteristics.

It is known that ice cream properties can be affected by the use of stabilizers, also often called thickeners. A problem that arises when using stabilizers is that the stabilizer deleteriously affects the feel of the ice cream in the mouth; a cloying, gummy or even greasy feel can occur.

Another problem with conventional ice creams is that at deep freeze temperatures, e.g. −20° C., such ice creams cannot be served or eaten as readily as when they are at normal eating temperatures, e.g. −10° C. The consumer cannot treat them even approximately in the normal manner immediately when taken from the deep freeze. In some cases conventional ice creams cannot be scooped out with a spoon at −20° C., i.e. are not readily spoonable when taken out of a deep freezer and need to stand for some time before they can be spooned out, served and eaten.

Methods have been proposed in the art for the reformulation of ice creams to ensure that properties, e.g. spoonability at deep freeze temperatures, are approximately those expected at normal eating temperatures. The difficulty is that such reformulation generally leads to ice cream products that do not have acceptable properties at normal eating temperatures. It seems impossible to get an ice cream that has at both deep-freeze and normal eating temperatures even approximately the serving and eating properties conventionally expected at normal eating temperatures and that is sufficiently stable and spoonable without having an unacceptable mouthfeel.

In view of the above, it is clear that there is a need in the art for providing an ice cream having an adequate stability and having improved spoonability at deep freeze temperatures.

The present invention aims to provide an ice cream that overcomes at least some of the above mentioned problems. In particular, the invention aims to provide an ice cream having adequate stability and spoonability.

SUMMARY OF THE INVENTION

In general, the invention relates to soluble cocoa products or soluble cocoa powders. The invention relates to methods for producing a soluble cocoa product from cocoa powder, to cocoa products obtained by the present method and to uses thereof, e.g. in a cocoa-derived material which can be a syrup, a ready to use beverage or a powder composition; or in frozen products, such as ice creams.

In particular, in one aspect, the present invention provides improved methods for producing a soluble cocoa product having improved solubility, organoleptic properties and/or improved properties which are relevant for various applications, e.g. for the preparation of food stuffs such as baked products, beverages, and confectionary.

The present invention is at least in part based on the Applicants' finding that by applying the present method, enzymatic degradation and modification of proteins present in the cocoa beans is improved resulting in a soluble cocoa product having an improved composition and nutritional value.

In particular, the Applicant provides methods for producing a soluble cocoa product having improved solubility and improved properties, including, a lower theobromine and/or a lower caffeine content. The obtained cocoa product advantageously has not only a better taste, but also an increased nutritional value.

In a first aspect, the invention relates to a method for producing a soluble cocoa product from cocoa powder comprising the steps:

a) preparing an aqueous suspension of cocoa powder (1),
b) optionally treating said suspension with one or more degrading enzymes (2),
c) submitting (3) the suspension obtained in step b) to a pH treatment comprising treating said suspension for at least 2 hours at a suitable pH, a temperature of at least 100° C., and a pressure which is at least 1 bar higher than the ambient pressure,
d) optionally bringing the pH of the suspension obtained in step c) to a pH value corresponding with the pH of the suspension obtained in step a),
e) treating (4) the suspension obtained in step c) or d) with one or more degrading enzymes,
f) separating (6) the suspension (5) obtained in step e) into insoluble material (8) and a soluble part (7), and
g) obtaining soluble cocoa components (10) from the soluble parts (7).

The enzymatic treatment in step b) according to the present method optionally comprises a treatment with one or more starch degrading enzymes, preferably selected from the group comprising amylases and alpha-amylases. The term "starch-degrading enzymes" as used herein refer to enzymes that are capable of degrading starch and/or any degradation products thereof.

The enzymatic treatment in step e) according to the present method preferably comprises the subsequent steps of e1) treating with one or more cell-wall degrading enzymes, and e2) treating with one or more protein degrading enzymes. The term "cell-wall degrading enzymes" as used herein refer to enzymes that are capable of degrading components of the plant cell wall and/or any degradation products thereof. The term "protein degrading enzymes" as used herein refer to enzymes that are capable of degrading proteins and/or any degradation products (e.g. peptides) thereof.

The cell-structures of cocoa are insoluble and difficult to break down, especially after a roasting step in the production of the cocoa powder. As a consequence of the roasting step, proteins and polyphenols are bound to the plant cell-walls, creating thick cell structures. It is difficult to destroy such cell walls physically or enzymatically. Furthermore the application of chemical processes for breaking down the cell-wall structures is in general unwanted in the production of a food-grade product.

The present invention provides a solution to this problem by applying the above-described method. The Applicant provides a method which allows destroying the cocoa cell walls, such that a cell wall is obtained that can be more easily degraded by enzymes. Advantageously the present method does not destroy components of nutritional value contained within the cocoa cells.

In a preferred embodiment, the invention relates to a method wherein said pH treatment comprises treating said suspension for at least 2 hours at a pH of at least 7, and preferably at least 10, a temperature of at least 100° C., and a pressure which is at least 1 bar higher than the ambient pressure.

More in particular, the Applicant has shown that it is possible to disentangle the cellulose and pectine-molecules in the cell-wall by increasing the pH, preferably to a pH higher than 7, 8, 9, 10, 11, 12, or 13, and preferably to a pH of between 10-14 or 11-14 or 10-12. By doing so, the tight structure of the cell walls can be loosened.

In another preferred embodiment, the invention relates to a method wherein said pH treatment comprises treating said suspension for at least 2 hours at a pH lower than 3, preferably a pH between 1 and 3, a temperature of at least 100° C., and a pressure which is at least 1 bar higher than the ambient pressure.

More in particular, it is also possible to disentangle the cellulose and pectine-molecules in the cell-wall by decreasing the pH, preferably to a pH lower than 3, 2, or 1, and preferably by applying a pH of between 3 and 1. By doing so, the tight structure of the cell walls can also be loosened.

In order to succeed, additional energy is to be applied, for example in the form of an increased temperature. Preferably the temperature is increased to a temperature of at least 70, 80, 90, 100, 110, 115, 120, 125, 130, 135, 140° C.

Furthermore, in order to avoid that the suspension would boil and that thus a lot of energy would be lost, and that an industrial process would become less feasible, the pressure applied during the process is also preferably increased. In a preferred embodiment, the applied pressure or ambient pressure is initially comprised between 1 and 1.5 bar, and is for instance 1, 1.1, 1.2, 1.3, 1.4 or 1.5 bar. Preferably said applied or ambient pressure is raised during the method to a pressure comprised between 2 to 5 bar, and for instance to a pressure of 2, 3, 4 or 5 bar. The terms "ambient pressure" and "applied pressure" are used herein as synonyms.

In a preferred embodiment, the present suspension is therefore maintained in step c) for at least 3 hours, and preferably for more than 3 hours at a suitable pH, and for instance a pH of 10 to 14 or a pH of 1 to 3, a temperature of at least 120° C., and a pressure which is at least 1 bar higher than the ambient pressure.

After a certain contact time, for instance 0.5, 1, 2, 3, 4, 5, etc. . . . hours, the pH can be adjusted again and the pH of the suspension can be brought to a pH value corresponding to the pH of the suspension obtained in step a). Preferably the pH is adjusted to a pH which provides optimal conditions for the activity of enzymes that are added to the suspension in a next step of the present method. The method therefore comprises the step of bringing said suspension to a pH that is for instance lower than 10, 9, 8 or 7, preferably to a pH comprised between 5 and 7. In a preferred embodiment, the invention relates to a method wherein the suspension is brought in step d) to a pH of 5 to 7, and for instance to a pH of 5 to 6. When using cell-wall degrading enzymes such as e.g. cellulases, the cell-walls that have been weakened due to the above described pH treatment, can now be broken down even more. This also shows that the pH treatment is a non-reversible process.

When filtrating this treated suspension, a lot of foam—that can be visually observed—is created, indicating that pectines and proteins are released from the cocoa cell structures.

Another embodiment of the invention relates to a method as described above, wherein said suspension is prepared by mixing the cocoa powder with a solution comprising salt in a below isotonic concentration.

Another embodiment of the invention relates to a method as described above, wherein said suspension is prepared by mixing the cocoa powder with distilled water or double distilled water.

Another embodiment of the invention relates to a method as described above, further comprising a step of ultrasonic treatment during step c).

Another embodiment of the invention relates to a method as described above, wherein the separation is performed by filtration, decantation centrifugation, or a combination thereof.

Another embodiment of the invention relates to a method as described above, wherein the suspension obtained in step b) is submitted to a heat shock treatment before being submitted to said pH treatment. Preferably said heat shock treatment comprises cooling the suspension obtained in step b) to a temperature below 0° C., and preferably below −10° C., −20° C., −30° C. or even below −40° C., followed by shock heating the cooled suspension by contact with a hot aqueous solution of at least 70° C. In a preferred embodiment, said aqueous solution is pure water or distilled or double distilled water at a temperature of between 95 and 100 deg C.

Another embodiment of the invention relates to a method as described above, wherein said soluble cocoa components are freeze dried, roller dried or spray dried.

Optionally the present method may further comprise an additional step of desalting the soluble part obtained in step f).

A second aspect of the invention relates to a method for producing a soluble cocoa product from cocoa powder comprising the steps:

1) Preparing an aqueous suspension of cocoa powder (21),
2) Treating (22) the suspension with one or more degrading enzymes,
3) Separating (24) the treated suspension (23) into insoluble material (226) and a soluble part (25).
4) Freezing (227) the insoluble material (226),
5) Shock heating (210) the frozen insoluble material (228) by contact with hot aqueous solution, to obtain a further treated suspension (211),
6) Separating (229) the further treated suspension (211) into insoluble material and a soluble part (25'), and
7) Obtaining soluble cocoa components (212) from the soluble parts (25, 25').

Another embodiment of the invention relates to the second aspect method as described above, wherein said suspension is prepared by mixing the cocoa powder with a solution comprising salt in a below isotonic concentration.

Another embodiment of the invention relates to the second aspect method as described above, wherein said suspension is prepared by mixing the cocoa powder with distilled water or double distilled water.

Another embodiment of the invention relates to the second aspect method as described above, wherein said degrading enzymes are any of amylases, polyphenolase, proteases, pentosanases, glucanases, cellulases, carbohydrases, xylanases, pectinases, and alpha-amylase.

Another embodiment of the invention relates to the second aspect method as described above, further comprising step of ultrasonic treatment before, during or after step 2).

Another embodiment of the invention relates to the second aspect method as described above, wherein the separation (24) is performed by filtration, decantation, centrifugation, or a combination thereof.

Another embodiment of the invention relates to the second aspect method as described above, wherein said insoluble material (226) is frozen by placing in a freezer or by contacting with a freezing substance.

Another embodiment of the invention relates to the second aspect method as described above, wherein said hot aqueous solution is preferably at 70 deg C. or above.

Another embodiment of the invention relates to the second aspect method as described above, wherein said aqueous solution is pure water or distilled or double distilled water at 95 and 100 deg C.

Another embodiment of the invention relates to the second aspect method as described above, further comprises the steps of:

5a) Treating (22') the further treated suspension (211) with one or more degrading enzymes to obtain a further treated suspension (211),
5b) Optionally repeating (213*a*) step 5a) at least once.

Another embodiment of the invention relates to the second aspect method as described above, further comprises the steps of:
5a) Treating (22') the further treated suspension (211) with one or more degrading enzymes,
5b) Repeating (213b), at least once, steps 3) to 5a) using the further treated suspension (211) of step 5a).

Another embodiment of the invention relates to the second aspect method as described above, wherein said soluble cocoa components (212) are freeze dried, roller dried or spray dried.

Optionally, another embodiment of the invention relates to the second aspect method as described above, further comprising a step of desalting the soluble part obtained in step 7).

Another embodiment of the invention relates to the second aspect method as described above, applied to solubilising plant material.

Another embodiment of the invention relates to a method for solubilising plant material comprising the steps of:
1) Freezing the plant material,
2) Shock heating the frozen plant material (228) by contact with hot aqueous solution, to obtain a further treated suspension (211),
3) Separating the further treated suspension (211) into insoluble material and a soluble part (25'), and
4) Obtaining soluble plant material from the soluble parts.

Another embodiment of the invention relates to method for solubilising plant material as described above, comprising additional conditions or steps as defined above in the second aspect method.

In a third aspect, the invention relates to a method for producing a soluble cocoa product from cocoa powder comprising the steps of:
a) preparing an aqueous suspension of cocoa powder (31),
b) optionally treating said suspension with one or more degrading enzymes (32),
c) submitting (33) the suspension obtained in step b) to a pH treatment (335) comprising treating said suspension for at least 2 hours at a suitable pH, a temperature of at least 100° C., and a pressure which is at least 1 bar higher than the ambient pressure,
d) optionally bringing the pH of the suspension obtained in step c) to a pH value corresponding with the pH of the suspension obtained in step a),
e) treating (32') the suspension obtained in step c) or d) with one or more degrading enzymes,
f) separating (34) the suspension (33) obtained in step e) into insoluble material (336) and a soluble part (35), whereby said insoluble material is subjected to the steps of:
i. Freezing (337) the insoluble material (336),
ii. Shock heating (310) the frozen insoluble material (338) by contact with hot aqueous solution, to obtain a further treated suspension (311),
iii. Separating (339) the further treated suspension (311) into insoluble material and a soluble part (35'), and
g) Obtaining soluble cocoa components (312) from the soluble parts (35, 35').

Another embodiment of the invention relates to the third aspect method as described above, further comprising the steps as defined above.

Optionally, another embodiment of the invention relates to the third aspect method as described above, further comprising a step of desalting the soluble part obtained in step g).

In a fourth aspect, the invention relates to a soluble cocoa product having a degree of solubility in a solvent, preferably a polar solvent and preferably a water-based or aqueous solvent, i.e. a solvent containing water, of at least 50%, and more preferably at least 70%, and even more preferably of at least 90%. In a particularly preferred embodiment a soluble cocoa product is provided having a degree of solubility in a solvent, preferably a polar solvent, of between 95 and 100%, and preferably of between 98 and 100%.

The present invention also relates to a soluble cocoa product obtained by a method as described above. The invention also relates to a soluble cocoa product obtainable by a method as described above. The present soluble cocoa product has an improved composition and nutritional value. In a preferred embodiment, said soluble cocoa product has a solubility of at least 50%, and preferably of at least 60, 65, 70, 75, 80, 85, 90, 95%, 99% and preferably a solubility of between 50-100%, preferably of between 80-100%, and more preferably of between 95-100% or even of between 98 and 100%.

In yet another aspect the invention relates to a pre-concentrate comprising a soluble cocoa product as defined herein, whereby said pre-concentrate is in a liquid form, preferably in the form of a syrup or solution, or in a solid form, preferably in the form of a dry or lyophilized (freeze-dried) form.

In still another aspect, the invention relates to a beverage pouch comprising the soluble cocoa product or a pre-concentrate as described above.

In yet another aspect, the invention relates to a beverage comprising a soluble cocoa product or a pre-concentrate as described above.

In another aspect, the invention is directed to a cocoa-derived material comprising a soluble cocoa powder as defined herein and a cocoa extract, wherein said extract comprises more than 25 wt % based on the extract of polyphenols. The present invention provides a cocoa-derived material and a beverage comprising a cocoa powder, preferably a highly soluble cocoa powder, in combination with a cocoa extract, wherein said extract comprises a relatively high level of cocoa polyphenols. The present invention provides cocoa-derived materials and beverages with improved chocolate flavour and enriched polyphenol content. The cocoa-derived material can be a syrup, a ready to use beverage or a powder composition. The invention also relates to uses of this cocoa-derived material for preparing carbonated beverages containing cocoa. The invention further relates to a carbonated beverage comprising said cocoa-derived material and to methods for preparing such cocoa-derived materials and beverages.

The Applicant has shown that combination of a soluble cocoa powder with a cocoa extract provides a stable composition which can be used for preparing beverages or drinks having organoleptic properties, and in particular taste and color properties, which are significantly improved compared to beverages containing only a soluble cocoa powder or only a cocoa extract. In addition, the Applicant has shown that the addition of a polyphenol-rich cocoa extract in a beverage of the present invention improves the flavour of the beverage and provides the beverage with an increased amount of antioxidants leading to an improved and healthier beverage. Beverages prepared using a cocoa-derived material as defined herein provide improved health properties. Furthermore the addition of a polyphenol extract does not interfere with the solubility of the cocoa powder, resulting in a beverage having optimal physical properties. In accordance with the present invention, by mixing ingredients in specific relative amounts a product is obtained having a significant amount of the cocoa polyphenol concentration conserved in the finished product.

The present invention therefore in another aspect relates to a cocoa-derived material comprising a soluble cocoa powder and a cocoa extract, whereby said extract comprises more than 25% by weight based on the extract of polyphenols.

In a particular embodiment, the invention relates to a cocoa-derived material comprising a soluble cocoa powder and a cocoa extract, whereby said cocoa extract comprises polyphenols in an amount of more than 25% by weight based on the extract, and whereby said soluble cocoa powder has a solubility in an aqueous solvent at a temperature of 20° C. of at least 70%. Preferably said cocoa-derived material comprises a soluble cocoa powder having a solubility in an aqueous solvent at a temperature of 20° C. of at least 90%.

In one embodiment said cocoa-derived material is a liquid material, preferably a syrup. In another embodiment, said cocoa-derived material is in a dried form and consists of a powder composition.

In an embodiment a cocoa-derived material is provided, wherein said cocoa extract is comprises between 25 and 75% by weight of polyphenols, whereby said polyphenols comprise between 5 and 15% by weight of the cocoa extract of monomers and more than 20% by weight of the cocoa extract of one or more oligomers. Said monomers may comprise between 5 and 15% by weight of the extract of epicatechin and between 0.5 and 5% by weight of the extract of catechin. Said oligomers may comprise (% by weight of the extract) between 5 and 15% by weight of dimers, between 5 and 15% by weight of trimers, between 2.5 and 10% by weight of tetramers, between 2.5 and 10% by weight of pentamers, between 2.5 and 10% by weight of hexamers, between 0.5 and 5% by weight of heptamers, between 0.5 and 5% by weight of octamers, between 0.5 and 5% by weight of nonamers, and/or between 0.1 and 3% by weight of decamers. Preferably said extract contains less than 10 and preferably less than 5% by weight of xanthines. In another preferred embodiment said extract contains less than 10 and preferably less than 5% by weight of theobromine.

In another an embodiment a cocoa-derived material is provided, wherein said soluble cocoa powder comprises an amount of theobromine which is lower than 5% by fat-free dry weight of the powder. In another embodiment, a cocoa-derived material is provided, wherein said soluble cocoa powder comprises an amount of caffeine which is lower than 1% by fat-free dry weight of the powder. In another embodiment, a cocoa-derived material is provided, wherein said soluble cocoa powder comprises an amount of polyphenols comprised between 1 and 24% by fat-free dry weight of the powder. In another embodiment, a cocoa-derived material is provided, wherein said soluble cocoa powder comprises an amount of glucose, glucose oligomers and/or dextrines comprised between 10 and 60% by fat-free dry weight of the powder.

In another aspect, the invention relates to a method for preparing a cocoa-derived material. In one embodiment, the method involves a method for preparing a cocoa-derived material in syrup form. In another embodiment, the method involves a method for preparing a cocoa-derived material in dried form.

In another aspect, the invention relates to a carbonated cocoa-derived beverage or drink comprising between 0.01 and 30% by weight of a cocoa-derived material, and for instance between 5 and 30% by weight or between 10 and 30% by weight of a cocoa-derived material, and between 70 and 99.99% by weight of a liquid, and for instance between 70 and 99.5% by weight or between 70 and 90% by weight of a liquid, preferably water, most preferably carbonated water, wherein said cocoa-derived material comprises a soluble cocoa powder and a cocoa extract, whereby said cocoa extract comprises more than 25% by weight based on the extract of polyphenols. In a preferred embodiment said cocoa-derived beverage is as defined in the present application. In a particular embodiment, the invention relates to a beverage comprising between 0.01 and 30% by weight of a cocoa-derived material, and between 70 and 99.99% by weight of a liquid, preferably water, most preferably carbonated water, wherein said cocoa-derived material comprises a soluble cocoa powder and a cocoa extract, whereby said soluble cocoa powder has a solubility in an aqueous solvent at a temperature of 20° C. of at least 70%, preferably of at least 90%; and whereby said cocoa extract comprises more than 25% by weight based on the extract of polyphenols.

In another particular embodiment, a beverage according to the invention is provided which comprises a suitable amount of carbonated water and/or carbon gas.

In another aspect, the invention relates to a method for preparing a beverage or drink comprising a cocoa-derived material as defined herein.

In yet another aspect, the invention relates to the use of a cocoa-derived material is as defined herein for the preparation of a beverage. In a particular embodiment the invention relates to the use of a cocoa-derived material is as defined herein for the preparation of a beverage, wherein said beverage is a carbonated drink which comprises a suitable amount of carbonated water and/or carbon gas.

By combining a cocoa extract and a soluble cocoa product in accordance with the present invention, a cocoa-derived composition can be obtained which is particularly suitable for preparing beverages, as the combination of both of these components permits to improve quality, nutritional and organoleptic properties, such as for instance, enhanced taste and/or flavor stability, enhanced digestibility, improved nutritional value of prepared beverages. Beverages according to the invention are significantly preferred when tested by taste panels.

In addition, it has been shown that a combination of a cocoa extract and a soluble cocoa product in a cocoa-derived composition according to the invention significantly prevents sedimentation of the beverage. Beverages comprising a cocoa-derived material according to the invention remain substantially crystal clear and free from sedimentation when stored under refrigerated or ambient temperatures for several weeks up to several months. This is unexpected, especially because beverages comprising a cocoa powder are known in the art to suffer from sedimentation problems.

In accordance therewith, by combining a cocoa extract and a soluble cocoa powder as defined herein in a cocoa-derived material, a material is obtained that has a considerable shelf-life; and that can be stored for a relatively long time without showing substantial sedimentation.

Further, a cocoa-derived material as disclosed herein and beverages prepared therewith provide health benefits, e.g. since they have a great antioxidant power. The present invention provides antioxidant-rich food products that have potential to protect against oxidation, or cellular damage caused by free radicals. Moreover, a cocoa-derived material or beverage as disclosed herein has improved amounts of flavonols. The invention thus provides flavonol-rich food products that have health potential, e.g. for hart health or for mood improvement.

Also, carbonated beverages according to the invention have the benefit of showing improved shelf life and taste. Moreover, carbonated drinks according to the invention have the benefit of showing improved stability, e.g. as they are less susceptible to microbial contamination.

In another aspect, the present invention further relates to an ice cream comprising a cocoa powder, and in particular to an ice cream comprising up to 15 wt % of a soluble cocoa powder, wherein said cocoa powder has a solubility in water of at least 50% at a temperature of less than 10° C. The invention further relates to a method for preparing such ice cream and the use thereof in food products. The invention provides an ice cream which has excellent spoonability, which is has increased capability of stabilizing oxygen and a suitable overrun, and which provides a good feeling and taste in the mouth.

In an embodiment, the present invention is related to the use of a highly soluble cocoa powder in ice cream.

The Applicant has now shown that by addition of a particular amount of a highly soluble cocoa powder, an ice cream can be obtained having suitable spoonability and hardness characteristics. Furthermore, by adding a soluble cocoa powder as defined herein, the invention provides an ice cream with desired handling, nutritive, flavor and/or organoleptic properties. Further, a process for producing an ice cream having a property of excellent spoonability even at a freezing temperature is provided by means of a simple and relatively fast process.

In an aspect, the present invention provides an ice cream comprising up to 15 wt %, and preferably between 2 and 10 wt % of a soluble cocoa powder, wherein said soluble cocoa powder has a solubility in water of at least 50%, preferably at least 75%, most preferably of 85 to 100% at a temperature of less than 10° C., preferably less than 5° C. In a preferred embodiment, an ice cream is provided comprising between 2 and 10 wt % of a soluble cocoa powder, wherein said soluble cocoa powder has a solubility in water of 95 to 100% at a temperature of 10° C.

In an embodiment, an ice-cream is provided having after 48 hours at −20° C. a hardness as measured with a texture analyzer as a force of less than 30 N for penetrating a cylindrical probe with flat bottom surface in said ice cream at a penetration depth of at least 10 mm.

In another embodiment, an ice-cream is provided having after 48 hours at −20° C. a hardness as measured with a texture analyzer as a force of less than 30 N for penetrating a metal cylindrical probe having a round flat bottom surface with a diameter of 6.35 mm in said ice cream at a penetration depth of 10 mm.

In another embodiment, an ice-cream is provided having after 24 hours at −20° C. a hardness as measured with a texture analyzer as a force of less than 25N for penetrating a cylindrical probe with flat bottom surface in said ice cream at a penetration depth of at least 10 mm.

In another embodiment, an ice-cream is provided having after 24 hours at −20° C. a hardness as measured with a texture analyzer as a force of less than 25N for penetrating a metal cylindrical probe having a round flat bottom surface with a diameter of 6.35 mm in said ice cream at a penetration depth of 10 mm.

In another aspect, the present invention provides a method for preparing an ice cream, comprising the steps of:
a) preparing an aqueous ice cream mixture comprising up to 15 wt %, and preferably between 2 and 10 wt % of a soluble cocoa powder, wherein said soluble cocoa powder has a solubility in water of at least 50%, preferably at least 75% most preferably of 85 to 100% at a temperature of less than 10° C., preferably less than 5° C.,
b) heating said ice cream mixture to a temperature of between 65 and 95° C. for at least 1 minute,
c) pasteurizing the heated mixture,
d) optionally homogenizing the pasteurized mixture,
e) cooling, aging and freezing to a temperature of between 4° C. and −8° C. while aerating the mixture,
f) optionally including components such as chocolate, fruits, nuts or fibers, and
g) packaging and hardening by bringing at a temperature lower than −15° C.

The Applicant has surprisingly found a functional effect of cocoa powder that is highly soluble at relatively low temperatures on the spoonability of an ice cream, as indicated by the hardness of the product. In particular, it was shown by the Applicant that ice cream comprising a cocoa powder according to the invention has improved characteristics, particularly improved spoonability, compared to ice cream comprising a conventional cocoa powder. The Applicant has shown that by using a highly soluble cocoa powder, the spoonability of the ice cream comprising this cocoa powder can be improved. This effect is unexpected, especially since there is no indication in the prior art that solubility of a cocoa powder would have an effect on the hardness or spoonability of ice cream. The invention thus provides a ice cream which is better spoonable, which is softer, which has an increased capability of stabilizing oxygen, i.e. improved overrun, and has a better mouthfeeling, i.e. not sandy.

In addition, by using a soluble cocoa powder as defined herein to prepare an ice cream according to the invention, the method of preparing said ice cream is significantly improved; since sedimentation of the cocoa powder during the ice cream preparation process can be greatly reduced and even avoided; and the resulting ice cream has better taste, organoleptic and physical properties.

With the insight to better show the characteristics of the invention, some preferred embodiments and examples are described hereafter referring to the enclosed drawing.

FIGURE LEGENDS

DETAILED DESCRIPTION OF THE INVENTION

Definitions

Figure 1:
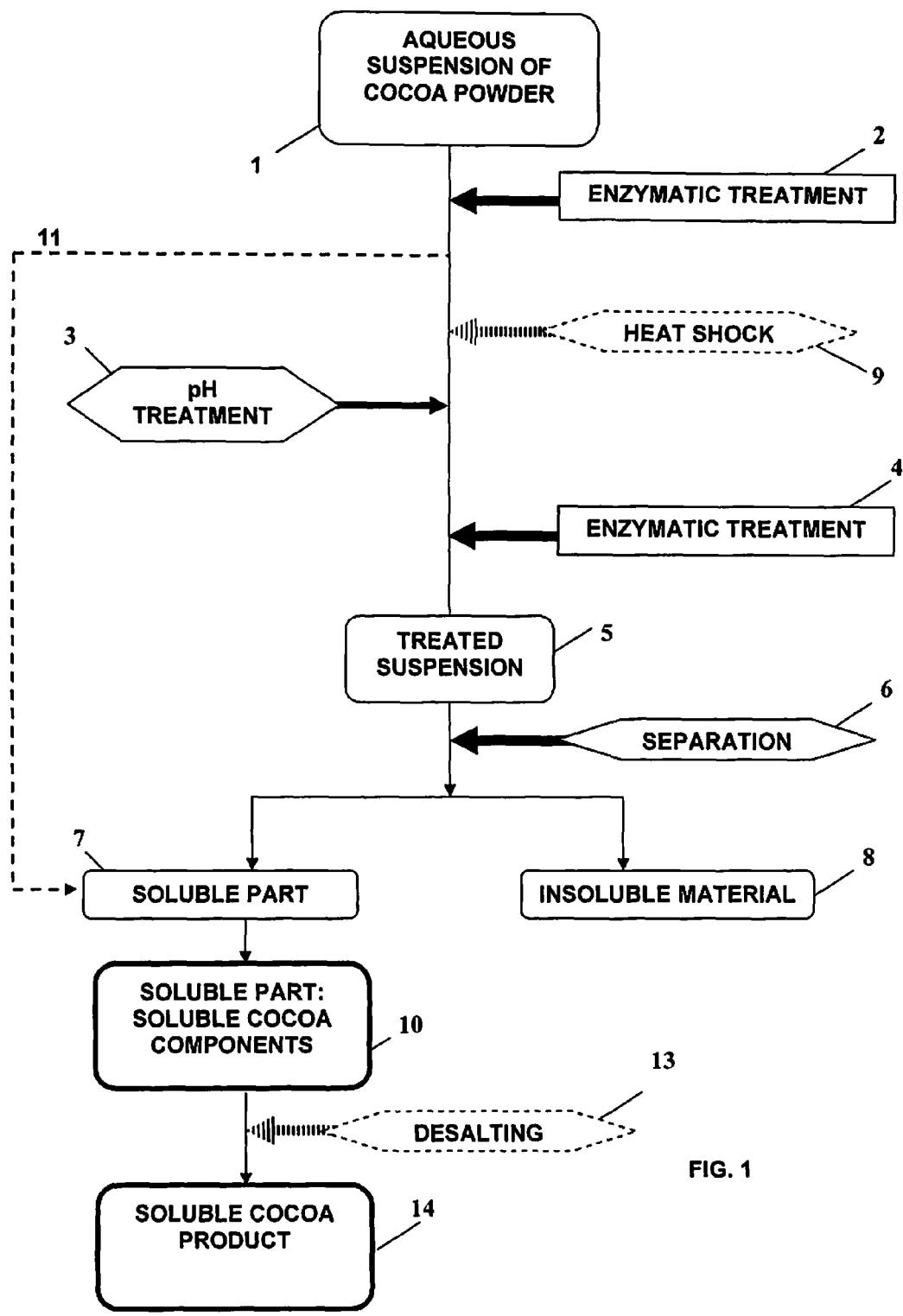
FIG. 1 is a flow chart showing steps of a method according to a first aspect of the present invention.

Unless defined otherwise, all technical and scientific terms used herein have the same meaning as is commonly understood by one of skill in the art. All publications referenced herein are incorporated by reference thereto. All United States patents and patent applications referenced herein are incorporated by reference herein in their entirety including the drawings.

The articles "a" and "an" are used herein to refer to one or to more than one, i.e. to at least one of the grammatical object of the article. By way of example, "a sample" means one sample or more than one sample.

Throughout this application, the term "about" is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of samples, and can also include 1.5, 2, 2.75 and 3.80, when referring to, for example, temperatures). The recitation of end points also includes the end point values themselves (e.g. from 1.0 to 5.0 includes both 1.0 and 5.0).

Where a percentage is recited in respect of a quantity, it refers to a weight ratio (w/w), unless otherwise indicated.

The term "cocoa-derived" material or beverage as used herein is intended to refer to a material or beverage which contains components that are obtained from cocoa beans. It is noted that the terms "cocoa" and "cacao" as used herein are considered as synonyms.

By "soluble components", it is meant that these are molecules, in a fluid at ease, that do not sink or form a sediment under any force, for example gravitation force. The term "soluble cocoa components" refers to molecules derived from cocoa that do not sink or form a sediment under any force, for example gravitation force in a fluid at ease, e.g. in a polar, water-based solvent as defined above such as milk, water, an alcohol or a mixture thereof.

"Solubility" or "degree of solubility" refers to the ability for a given substance, i.e. the solute, herein for instance cocoa powder, to dissolve in a fluid at ease, in particular a solvent. Solvents comprise polar solvents, and preferably water-based or aqueous solvents, i.e. solvents containing water, such as, but not limited to water, milk, an alcohol, an alcoholic drink containing water, and mixtures thereof. A "solute" as used herein may in some embodiments of the invention refer to either a powder composition or a soluble cocoa powder as defined herein.

Solubility is measured in terms of the maximum amount of solute dissolved at a specified temperature, for instance 20° C., in a definite amount of the solvent at equilibrium, without the use of emulsifiers. The term "% solubility" (or % dissolution) as used herein thus refers to the amount in weight % of solute that is dissolved in a solvent as defined above. A value of 50% solubility for instance indicates that 50 wt % of the solute is dissolved, while 50 wt % will sink or form a sediment. 100% solubility refers to a solute which is wholly soluble in a solvent as defined above so that such solution remains free of sediment.

Solubility is measured using methods known in the art.

For instance, solubility is measured by agitating or shaking at a temperature of 20° C. and a pressure of 1 atm an amount of 10 gram of solute (e.g. a conventional cocoa powder, cocoa composition or soluble cocoa powder as defined herein) with an amount of 90 g of solvent of choice for at least 2 hours, when avoiding evaporation by using a closed system. Then the solution is filtered over a whatmann filter with a pore size between 5 and 12 micrometers. The filtrate is dried in an oven overnight at 105° C., and the amount of dry matter is determined. Solubility is calculated based on the amount of dry matter remaining after filtration compared to the amount of solute put into practice.

Another technique includes centrifugation of an amount of 10 gram of solute (e.g. a conventional cocoa powder, cocoa composition or soluble cocoa powder as defined herein) with an amount of 90 g of solvent as defined herein with a centrifuge at 10000 RPM for 5 minutes. After centrifugation, the upper 'soluble' layer is used to measure the dry matter content according to the procedure as described above.

The terms "cocoa powder" and "cocoa start powder" are used herein as synonyms and are intended to refer to a cocoa powder that is used as starting material in a method of the present invention. Such cocoa powder contains soluble as well as insoluble cocoa components.

The terms "cocoa end powder", "cocoa product", "soluble cocoa powder" and "soluble cocoa product" are used herein as synonyms and are intended to refer to a cocoa powder that is obtained or that is obtainable as end product when carrying out a method of the present invention. These terms refer to cocoa components provided in a powder form, the cocoa powder being soluble or in other words the cocoa powder does not sink or form a sediment under any force, for example gravitation force in a fluid at ease, e.g. in a polar, water-based or aqueous solvent such as milk, water, an alcohol or a mixture thereof.

A) Method for Producing a Soluble Cocoa Product from Cocoa Powder

The present invention relates to the finding that the "solubilisation" of cocoa powder can be increased by a process applying different techniques, including a combination of enzymatic treatment, pH treatment under increased pressure, and temperature treatment. It further relates to the finding that the solubilisation of cocoa powder can alternatively be increased by a process whereby the different techniques include enzymatic treatment, ultrasonic treatment and heat shocking.

The term "solubilising" refers to the process of extracting soluble cocoa components from a starting material, herein a cocoa start powder. In certain embodiments of the present invention, the term "solubilising", "recuperating" or "extracting" or "making soluble" are used as synonyms. The term "solubilisation" in this context thus refers to a process of solubilising soluble component from a starting material, herein a cocoa powder.

In certain embodiments of the present invention, the terms "solubilisation" and "yield" are used as synonyms. A solubilisation or yield of 70% for instance indicates that 70% of the cocoa components present in a starting material (a cocoa start powder) are solubilised or are already soluble and are recuperated in accordance with a method according to the invention.

The invention provides a method having a yield of between 50 and 100%, and preferably of at least 50, 55, 60, 65, 70, 75, 80, 85, 90, 95, or 99%. The invention thus relates to a method for providing a solubilisation of a cocoa powder of between 50 and 100% and preferably of at least 50, 55, 60, 65, 70, 75, 80, 85, 90, 95, or 99%. Moreover, the present invention provides a method wherein solubilisation of a cocoa powder can be substantially increased by applying only once the different steps of the methods as defined herein and without having the need to repeat two or more times one or more of the steps of a method as defined herein.

The yield or solubilisation is determined in accordance with the present invention according to the following method:
  a suspension is prepared, e.g. a suspension of 10% w/w is prepared by suspending 10 grams of cocoa powder in 90 grams of distilled water,
  a first sample thereof is dried in an oven at 105° C. overnight, and the dry matter content thereof is determined. From this dry matter content the dry amount of added enzymes and pH-regulating substances (such as e.g. alkali or acid solutions such as NaOH or HCl solutions) is deduced. This corresponds to the first dry matter content.
  a second sample thereof is filtered over a whatmann filter with a pore size between 5 and 12 micrometers. The filtrate is also dried in an oven overnight at 105° C., and the dry matter content thereof was determined. From this dry matter content, the dry amount of the soluble fraction of added enzymes and pH-regulating substances (such as e.g. alkali or acid solutions such as NaOH or HCl solutions) is deduced. This corresponds to the second dry matter content.

The quotient of the dry matter contents (expressed as a percentage compared to the first dry matter content) corresponds to the amount of cocoa powder that is solubilised. For instance, if the dry matter content of the first sample is 20 g and dry matter content of the second sample is 5 g, 25% of the cocoa powder has been solubilised. Or, if the dry matter content of the first sample is 20 g and dry matter content of the second sample is 10 g, 50% of the cocoa powder has been solubilised.

The invention provides a method for increasing solubilisation of a cocoa powder. The term "increasing solubilisation" in this context refers to a process which permits to increase the amount (in % w/w) of soluble cocoa components that can be extracted from a starting material, herein a cocoa powder. Compared to prior art methods, the present method permits to increase solubilisation of a cocoa powder with a factor of between 2 and 4. In other words, compared to prior art methods, the present method permits to increase the amount of soluble cocoa components that can be extracted or solubilised from a (standard) cocoa powder with a factor of between 2 and 4. An increase with a factor 2 for instance means that two times more soluble cocoa components can be extracted from a cocoa start powder with the present method compared to a prior art method (as illustrated for instance in example 1).

According to the present invention, between 50 and 100% (w/w) of cocoa (start) powder can be solubilised, i.e. can be recuperated from a cocoa start powder, while maintaining an acceptable good taste. This compares with a maximum of 45% achievable using existing techniques and knowledge, such as enzyme-treatment. The present methods further involve a significant improvement, since they have a very high yield. The new techniques are a significant improvement that almost double the yield, and yet are inexpensive to implement, using low cost physical treatments. Furthermore, they can avoid the use of chemicals, relying on aqueous solutions such as distilled water.

Reference is made in the description below to the drawings which exemplify particular embodiments of the invention; they are not at all intended to be limiting. The skilled person may adapt the present methods and substitute or insert or remove features and steps according to the common practices of the person skilled in the art.

A1) Cocoa Powder

The cocoa powder used as starting material in the invention is ordinary cocoa powder known to the person skilled in the art. An example of a composition of such powder is given in example 7.

Cocoa powder is prepared according to standard methods, for example, selecting cleaned cacao beans, crushing the beans in a crusher, removing the shells in a winnower, adding an alkalizing agent in a reactor, followed by grinding in a mill. Then, cocoa cake is obtained by removing part of cocoa butter from the cocoa mass in a cocoa press. The cocoa powder is produced by pulverizing the cake to fine powder in a pulverizer. In the above processes, the cocoa powder may or may not be alkalized, or an alkalized and a non-alkalized product may be used in combination.

As already described elsewhere, cocoa powder is available having a range of fat content, depending primarily on the amount of cocoa butter removed. The present invention applies to all ranges, improving the yield of soluble material regardless of the fat content. The yield is regardless of the fat content, when using a filter for separation of soluble and insoluble material. The fat will not dissolve in the water, but will also pass through the filter.

The cocoa powder may be in the form of particles obtained by spray drying having a substantially spherical shape. The average particle size may be from about 20 to 100 micrometers.

The particles may be further subjected to granulation into a granular form of a suitable size. Conventional granulation methods may be used, but the fluidized bed granulation and agitation granulation methods are especially preferred.

A2) Aqueous Suspension or Dispersion

The aqueous suspension or dispersion of cocoa powder 1, 21, 31 comprises cocoa powder at a concentration of 1, 2, 3, 4, 5, 10, 15, 20, 25, 30, 35, 40, 45%, or a value in the range between any two of the aforementioned values. Preferably, the concentration of cocoa powder is between 1 and 35% w/w. The aqueous component is a water-based solution described below. The suspension is prepared according to known methods, generally being homogenised to achieve an essentially uniform suspension.

It will be noted that in certain embodiment of the present invention the terms "suspension", or "dispersion" are used herein as synonyms.

The aqueous solution as used herein comprises water, and may also contain additional compounds such as minerals, salts, buffering agents, preservatives or any agents which maintain a suitable operating environment for enzymatic degradation. Such components are known in the art. Where additional compounds are present, they may be in a quantity below isotonic concentrations. This may mean the effective salt concentration of the additional compounds may be below that present in cells of cocoa powder.

The aqueous solution may be devoid of additional compounds, in which case the aqueous solution may consist of pure water e.g. distilled water, double distilled water, or purified distilled water. Alkali (e.g. $OH^-$, $NH_4^+$) or acid ions (e.g. $H^+$) may be present to adjust the pH.

A3) Method According to a First Aspect

With reference to FIG. 1, a method according to a first aspect of the present invention is illustrated. The method for producing a soluble cocoa product from cocoa powder comprises the steps:
- a) preparing an aqueous suspension of cocoa powder 1,
- b) treating said suspension with one or more degrading enzymes 2,
- c) submitting 3 the suspension obtained in step b) to a pH treatment comprising treating said suspension for at least 2 hours at a suitable pH—for instance at a pH at least 7, and preferably at least 10, or at a pH lower than 3—a temperature of at least 100° C., and a pressure which is at least 1 bar higher than the ambient pressure,
- d) optionally bringing the pH of the suspension obtained in step c) to a pH value corresponding with the pH of the suspension obtained in step a),
- e) treating 4 the suspension obtained in step c) or d) with one or more degrading enzymes, and
- f) separating 6 the suspension 5 obtained in step e) into insoluble material 8 and a soluble part 7.

The soluble cocoa components 10 are then obtained from the soluble part 7. This method may further comprise the step of desalting 13 the soluble part containing the soluble cocoa components 10, e.g. by means of ion exchange, to remove salts.

Enzymatic Treatment (2, 4)

The degrading enzymes used during enzymatic treatment 2, 4 are those which are capable of degrading insoluble molecules present in cocoa, such as polysaccharides, proteins, cellulose and others. These degrading enzymes are well known in the art of extraction of cocoa powder. Examples of degrading enzymes used in the art include polyphenolases, amylases, proteases, trypsine, pentosanases, glucanases, cellulases, hemicellulase, trypsine, carbohydrases, xylanases, pectinases, tannase, beta-amylase and alpha-amylase. One or more of these may be used in the enzymatic treatment of the suspension in the present invention.

The present invention encompasses the separate and sequential treatment with different classes of enzymes.

More in particular, the present method comprises a first enzymatic treatment 2 which is carried out on the above-described aqueous suspension of cocoa powder obtained in step a). The degrading enzymes used during such first enzymatic treatment 2 are those which are capable of degrading starch present in cocoa, such as amylase, alpha-amylase and others. These degrading enzymes are well known in the art of extraction of cocoa powder.

The present method further comprises a second enzymatic treatment 4 which is carried out on the above-described suspension of cocoa powder that has been subjected to a first enzymatic treatment 2 and a pH treatment and that is obtained in step c) or d) of the present method.

Factors such as temperature, agitation, concentration and time of the enzymatic treatment 2,4 can be optimised according to the knowledge of the skilled person.

The enzymatic treatment 2,4 is generally allowed to continue until no further activity is detected, or after the rate of degradation has started to decrease. According to one aspect of the invention, the enzymatic treatment 2,4 proceeds for less than 1, 2, 3, 4, 5, 6, 7, 8, 9, hours, or for a period in a range between any two of the aforementioned values. Preferably, the enzymatic treatment 2,4 proceeds between 2 and 3 hours at optimal enzyme operating temperatures.

The concentration of enzyme used in the enzymatic treatment 2,4 will depend on its activity and also on the type of cocoa powder. The concentration can be optimised by the skilled person according to standard laboratory procedures. Generally the quantity of enzyme used is 0.1% w/w dry solids, though higher or lower concentrations are equally possible given the multiple factors available. According to one aspect of the invention, the total concentration of enzyme used is 0.01, 0.02, 0.05, 0.1, 0.15, 0.2% w/w dry solids, or a concentration in a range between any two of the aforementioned values. Preferably, the concentration of enzyme is between 0.01 and 0.10% w/w dry solids.

The temperature at which the enzymatic treatment 2,4 proceeds will depend on the optimum operating temperature of the enzymes, the type if cocoa powder and the stability of the components in the cocoa powder. Generally the enzymatic treatment 2 proceeds at the optimum pH and temperature for every enzyme, though higher or lower temperatures are equally possible given the multiple factors available. According to one aspect of the invention, the enzymatic treatment proceeds at a temperature equal to or less than 20, 30, 40, 50, 60, 70, 80, 90, 100, 110, 120 or 130 deg C., or a temperature in a range between any two of the aforementioned values.

In a preferred embodiment, enzymatic treatment 4 of the suspension in step e) according to the present invention comprises the subsequent steps of:

e1) treating with one or more cell-wall degrading enzymes, preferably selected from the group comprising pentosanases, glucanases, cellulases, hemicellulases carbohydrases, xylanases, pectinases, tannases, and more preferably cellulases and pectinases, e2) treating with one or more protein degrading enzymes, preferably selected from the group comprising proteases, e.g. trypsine, and e3) optionally treating with one or more other enzymes such as for instance polyphenolases.

According to such process, first cell wall structures are degraded by applying cell wall degrading enzymes. After such step, protein degrading enzymes are applied, for instance proteases, or for instance other enzymes capable of degrading protein into peptides. The invention reveals that when the cocoa cell walls are first broken, it is possible to enzymatically treat molecules that were encapsulated in the cell, such as proteins. In a particularly preferred embodiment, first cellulases and pectinases are applied, followed by proteases. Optionally further enzymes that have an effect on a non-solubilized components comprised in the cocoa suspension can be applied, e.g. polyphenolase.

In some embodiments, the enzymatic treatments 2, 4 are repeated more than once.

The suspension is generally agitated continuously during enzymatic treatment 2,4. This is achieved, using, for example, using a stirrer, jets, agitated vessel or any means known in the art.

After enzymatic treatment 2, 4, the reaction may be stopped. This can be achieved, for example, by heating to an inactivation temperature (e.g. 95 deg C.) or by adding an enzyme inhibitor to the mixture.

In an alternative embodiment, preferably when no heat shock treatment is applied (see below), step b) (i.e. enzymatic treatment 2) of the present method may be combined with step e2).

pH-Pressure Treatment (3)

The suspension that has been enzymatically treated with starch degrading enzyme(s) 2 is submitted to a pH treatment.

In one embodiment, the pH treatment 3 comprises treating said suspension for at least 2 hours at a pH of at least 7, a temperature of at least 100° C., and a pressure which is at least 1 bar higher than the applied or ambient pressure. The pH of the suspension can be increased to a pH higher than 7, and for instance to a pH of 7.5, 8, 8.5, 9, 9.5, 10, 10.5, 11, 11.5, 12, 12.5, 13, 13.5, or 14. Preferably the pH is raised to a pH of between 10 and 14.

In another embodiment, the pH treatment 3 comprises treating said suspension for at least 2 hours at a pH lower than 3, a temperature of at least 100° C., and a pressure which is at least 1 bar higher than the applied pressure. The pH of the suspension can be decreased to a pH lower than 3, and for instance to a pH of 2.8, 2.5, 2.3, 2.0, 1.8, or 1.5.

A further optional step may comprise bringing the pH of the suspension obtained in step c) to a pH value corresponding with the pH of the suspension obtained in step a).

The temperature is preferably higher than 100° C., the surrounding pressure must be high enough to prevent the suspension from boiling. Preferably, the temperature is equal to or more than 120° C. while the applied pressure is raised with 1 bar. These conditions can be obtained in a standard autoclave, used for sterilisation purposes. The contact time depends on the pH and temperature. When using 120° C. and pH 12 as parameters, a minimum contact time of 3 hours is preferably applied to treat the cell-walls.

After treatment with a pH of at least 7, the pH can be lowered to its initial value, preferably to a pH lower than 10, 9, 8, or 7, and for instance to a pH of 6, 5.5 or 5. After treatment with a pH of lower than 3, the pH can be increased to its initial value, and for instance to a pH of 5, 5.5 or 6. This step permits to obtain a suspension with a neutral pH and with a pH value which is suitable for the activity of enzymes that will be applied to the suspension in a next step.

The choice of acid is preferably related to the used alkali. The resulting salt preferably is non-toxic and preferably non-soluble. Adjusting the pH, by adding an acid and an alkali, causes a great taste change by means of salt formation. This can be avoided by using an acid and an alkali that forms a highly insoluble salt. When separating the soluble and insoluble fraction afterwards, this salty taste can be avoided. For example $Ca(OH)_2$ and $H_3PO_4$ form a the highly insoluble calcium phosphate. Preferably for adjusting the pH use is made of an acid and an alkali that provide a salt having a solubility factor lower than $10^{-10}$. For instance for the above given example, the solubility factor can be calculated as: $([Ca]^3 \times [PO_4]^2)/[Ca_3(PO_4)_2]$ which should be lower than $10^{-10}$. The obtained salt and the used acid and alkali are non toxic.

In an example, common acids and alkali such as NaOH and/or HCl can be used. When using such acids and alkali, the soluble part obtained by the present method may be desalted in order to remove soluble salts. This desalting step can for instance be done after separating the soluble part from the insoluble material and can for instance by performed by means of ion exchange.

Heat Shock Treatment (9)

The suspension obtained in step b) can be submitted to a heat shock treatment 9 before being submitted to the above-described pH treatment. Heat shock treatment is preferably carried out after the first enzymatic treatment 2.

Heat shock treatment 9 may comprises cooling the suspension obtained in step b) to a temperature below 0° C., and preferably below −10, −20, −30, or even −40° C., followed by shock heating the cooled suspension by contact with a hot aqueous solution of at least 70° C.

The temperature of the aqueous solution, sufficient to induce a shock effect is generally above 70 deg C., although there are also results with water at room temperature. According to one aspect of the invention, the temperature of the hot aqueous solution is equal to or greater than 70, 75, 80, 85, 90, 95, 96, 97, 97, 99, 100 deg C. or a value in the range between any two of the aforementioned values. Preferably, the temperature is between 85 and 100 deg C., preferably it is about 99 deg C. The step is normally performed at a pressure of 1 atmosphere, though it is within the scope of the invention to perform the step under reduced or increased pressure.

Preferably said aqueous solution is pure water or distilled or double distilled water at a temperature of between 95 and 100 deg C.

The heat shock can be allowed to continue until the temperature of the water has stabilised. Generally, the heat shock will be complete in less than 1 hour. According to one aspect of the invention, the heat shock proceeds for less than 0.25, 0.5, 0.6, 0.7, 0.8, 0.9, 1, 2, 3, 4, 5, 6, 7, 8, 9, 10 hours, or for a period in a range between any two of the aforementioned values. Preferably, the heat shock proceeds less than 30 minutes.

The ratio between the mass of suspension and mass of hot aqueous solution should be less than 1 i.e. there is an excess of hot aqueous solution. According to one embodiment of the invention, this ratio is less than or equal to 0.001, 0.003, 0.006, 0.01, 0.02, 0.04, 0.6, 0.08, 0.1, 0.2, 0.4, 0.8 or a value in the range between any two of the aforementioned values. Preferably it is between 0.1 and 0.5.

After heat shock, the treated suspension is submitted to a pH treatment as described above.

Ultrasonic Treatment

A step of ultrasonic treatment can optionally be applied to the aqueous suspension of cocoa powder 1. It can be applied before, during or after, but preferably during the pH treatment 3 of step c). This technique does not cause any taste changes to the product or significant molecular changes. The ultrasonic treatment can be applied using an ultrasonic probe, using an ultrasonic bath, or using any suitable means. According to one aspect of the invention, the ultrasonic treatment proceeds for less than 1, 2, 3, 4, 5, 6, 7, 8, 9, 10 minutes, or for a period in a range between any two of the aforementioned values. Preferably, the ultrasonic treatment proceeds for about 1 minute per litre at 25 kHz.

An ultrasonic treatment as applied in the methods of the present invention is meant to include treatments that proceed at more than 20 kHz. Such treatments do not comprise microwave treatments, which generally proceed at between 300 MHz and 300 GHz.

Separation (6)

The treated suspension 5 is separated 6 into insoluble material 8 and a soluble part 7. The soluble part 7 comprises the soluble cocoa components 10 together with the aqueous solution.

The separation 6 may be performed by any suitable means, for example filtration, decantation, centrifugation, a combination thereof, or any suitable technique known in the art. Representative techniques include filtration separation methods, such as continuous or discontinuous vacuum-filtration or ultrafiltration or a combination of these methods. Where centrifugation is used, it may be continuous or discontinuous. It can be performed at temperature in the range of from about 20 deg C. to about 40 deg C. for from about 20 minutes to about 30 minutes under a centrifugal force of from about 20,000 Z to about 32,000 Z. In some embodiments, the separation step 6 is repeated more than once.

During separation it is possible to remove the fat from the soluble components by using for example a 3-way decanter or a 3-way separator.

Additional Step (11)

The suspension obtained after step b) of the present method may optionally be separated into insoluble material and a soluble part 7. This is depicted in FIG. 1 as the hatched line 11. The soluble part 7 comprises the soluble cocoa components 10 together with the aqueous solution.

The separation may be performed by any suitable means, for example filtration, centrifugation, a combination thereof, or any suitable technique known in the art. Representative techniques include filtration separation methods, such as continuous or discontinuous vacuum-filtration or ultrafiltration or a combination of these methods. Where centrifugation is used, it may be continuous or discontinuous. It can be performed at temperature in the range of from about 20 deg C. to about 40 deg C. for from about 20 minutes to about 30 minutes under a centrifugal force of from about 20,000 Z to about 32,000 Z. In some embodiments, this separation step may be repeated more than once.

The residue that is obtained after this separation can be re-dissolved and further treated according to the present method. The soluble part obtained after treatment of such residue according to steps of the present method can then be combined with the soluble part that have been separated in an earlier stage of the process.

A4) Method According to a Second Aspect

Figure 2:
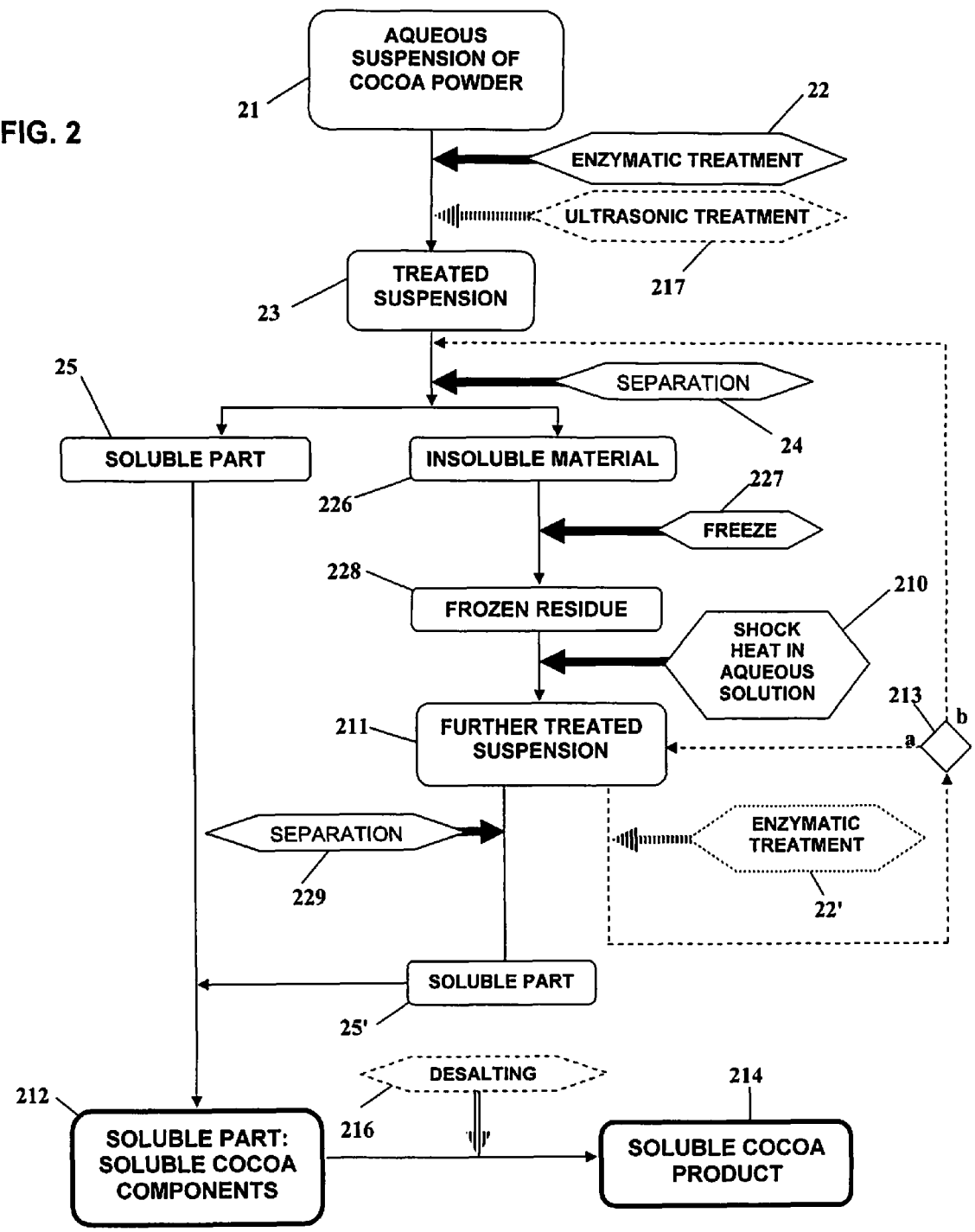
FIG. 2 is a flow chart showing steps of a method according to a second aspect of the present invention.

With reference to FIG. 2, a method according to a second aspect of the present invention is illustrated. The method for producing a soluble cocoa product from cocoa powder comprises the steps:

1) Preparing an aqueous suspension of cocoa powder 21,
2) Treating 22 the suspension with one or more degrading enzymes,
3) Separating 24 the treated suspension 23 into insoluble material 226 and a soluble part 25.
4) Freezing 227 the insoluble material 226, 5) Shock heating 210 the frozen insoluble material 228 with hot aqueous solution, to obtain a further treated suspension 211, and
6) Separating the further treated suspension 211 into insoluble material and a soluble part 25'.

The soluble cocoa components 212 are then obtained from the soluble part 25, 25'. This method may further comprise the step of desalting (not illustrated) the soluble part containing the soluble cocoa components 212, e.g. by means of ion exchange, to remove salts.

Enzymatic Treatment (22)

The degrading enzymes used during enzymatic treatment 22 are those which are capable of degrading polymeric biomaterials such as polysaccharides and/or proteins. These degrading enzymes are well known in the art of extraction of cocoa powder. Indeed steps 1) to 3) may be performed according to known procedures.

Examples of degrading enzymes used in the art include polyphenolases, amylases, proteases, pentosanases, glucanases, cellulases, carbohydrases, xylanases, pectinases, beta-amylase and alpha-amylase. One or more of these may be used in the enzymatic treatment of the suspension in the present invention.

Factors such as temperature, agitation, concentration and time of the enzymatic treatment 22 can be optimised according to the knowledge of the skilled person.

The enzymatic treatment 22 is generally allowed to continue until no further activity is detected, or after the rate of degradation has started to decrease. According to one aspect of the invention, the enzymatic treatment 22 proceeds for less than 1, 2, 3, 4, 5, 6, 7, 8, 9, hours, or for a period in a range between any two of the aforementioned values. Preferably, the enzymatic treatment 22 proceeds between 2 and 3 hours at optimal enzyme operating temperatures.

The concentration of enzyme used in the enzymatic treatment 22 will depend on its activity and also on the type of cocoa powder. The concentration can be optimised by the skilled person according to standard laboratory procedures. Generally the quantity of enzyme used is 0.1% w/w dry solids, though higher or lower concentrations are equally possible given the multiple factors available. According to one aspect of the invention, the total concentration of enzyme used is 0.01, 0.02, 0.05, 0.1, 0.15, 0.2% w/w dry solids, or a concentration in a range between any two of the aforementioned values. Preferably, the concentration of enzyme is between 0.01 and 0.10% w/w dry solids.

The temperature at which the enzymatic treatment 22 proceeds will depend on the optimum operating temperature of the enzymes, the type if cocoa powder and the liability of the components in the cocoa powder. Generally the enzymatic treatment 22 proceeds at the optimum pH and temperature for every enzyme, though higher or lower temperatures are equally possible given the multiple factors available. According to one aspect of the invention, the enzymatic treatment proceeds at a temperature equal to or less than 20, 30, 40, 50, 60, 70, 80, 90, 100, 110, 120 or 130 deg C., or a temperature in a range between any two of the aforementioned values.

In some embodiments, the enzymatic treatment 22 is repeated more than once e.g. again after the freezing 227 and heat shock 210 steps.

The suspension is generally agitated continuously during enzymatic treatment 22. This is achieved, using, for example, using a stirrer, jets, agitated vessel or any means known in the art. After enzymatic treatment 22, the reaction may be stopped. This can be achieved, for example, by heating to an inactivation temperature (e.g. 95 deg C.) or by adding an enzyme inhibitor to the mixture.

Ultrasonic Treatment (217)

A step of ultrasonic treatment 217 can optionally be applied to the aqueous suspension of cocoa powder 1. It can be applied before, during or after the enzymatic treatment 22 of step 2). Where it is applied before enzymatic treatment, the ultrasonic treatment 217 may make it easier for the enzymes to bind to their substrate, and for the heat shock treatment to be effective. This technique does not cause any taste changes to the product or significant molecular changes. The ultrasonic treatment can be applied using an ultrasonic probe, using an ultrasonic bath, or using any suitable means. According to one aspect of the invention, the ultrasonic treatment 217 proceeds for less than 1, 2, 3, 4, 5, 6, 7, 8, 9, minutes, or for a period in a range between any two of the aforementioned values.

Preferably, the ultrasonic treatment 217 proceeds for about 1 minute per litre at 25 kHz. Ultrasonic treatment is as defined above.

Separation (24)

The treated suspension 23 or further treated suspension 211 is separated 24 into insoluble material 226 and a soluble part 25, 25'. The soluble part 25, 25' comprises the soluble cocoa components 212 together with the aqueous solution.

The separation 24 may be performed by any suitable means, for example filtration, decantation, centrifugation, a combination thereof, or any suitable technique known in the art. Representative techniques include filtration separation methods, such as continuous or discontinuous vacuum-filtration or ultrafiltration or a combination of these methods. Where centrifugation is used, it may be continuous or discontinuous. It can be performed at temperature in the range of from about 20 deg C. to about 40 deg C. for from about 20 minutes to about 30 minutes under a centrifugal force of from about 20,000 Z to about 32,000 Z. In some embodiments, the separation step 24 is repeated more than once.

During the separating step it is possible to remove the fat from the soluble components by using for example a 3-way decanter or a 3-way separator.

Freezing (227)

The insoluble material 226 obtained after separation is subsequently frozen 227. The freezing step can be achieved by any means. For example, the insoluble material 226 can be placed in a container and put in a freezer or in contact with a freezing substance (e.g. liquid nitrogen, dry ice, freezing gas, freezing aerosol). The freezing should render the insoluble material 226 solid throughout. It is within practices of the skilled person to achieve an insoluble material 226 which is frozen throughout using known techniques.

The insoluble material 226 may be frozen 227 to any temperature at 0 deg C. or below i.e. between 0 deg C. and −273.15 deg C. For example, it may be frozen to 0, −1, −2, −5, −10, −15, −20, −25, −30, −35 −40 deg C., or to a temperature in a range between any two of the aforementioned values.

Shock Heating (210)

After freezing 227, the frozen residue 228 so produced is subject to a heat shock 210 by contacting with hot aqueous solution. This is generally performed by immersion of the frozen residue 228 in hot aqueous solution. The frozen residue 228 is rapidly liquefied, resulting in a further treatable suspension 211.

The aqueous solution is defined above. Preferably it is devoid of additional compounds i.e. it may be distilled water, double distilled water, or purified distilled water.

The temperature of the water, sufficient to induce a shock effect is generally above 70 deg C., although there are also results with water at room temperature. According to one aspect of the invention, the temperature of the hot aqueous solution is equal to or greater than 70, 75, 80, 85, 90, 95, 96, 97, 97, 99, 100 deg C. or a value in the range between any two of the aforementioned values. Preferably, the temperature is between 85 and 100 deg C., preferably it is about 99 deg C. The step is normally performed at a pressure of 1 atmosphere, though it is within the scope of the invention to perform the step under reduced or increased pressure. The heat shock 210 can be allowed to continue until the temperature of the water has stabilised. Generally, the heat shock will be complete in less than 1 hour. According to one aspect of the invention, the heat shock 210 proceeds for less than 0.25, 0.5, 0.6, 0.7, 0.8, 0.9, 1, 2, 3, 4, 5, 6, 7, 8, 9, 10 hours, or for a period in a range between any two of the aforementioned values. Preferably, the heat shock 210 proceeds less than 30 minutes.

The ratio between the mass of frozen residue 228 and mass of hot aqueous solution should be less than 1 i.e. there is an excess of hot aqueous solution. According to one embodiment of the invention, this ratio is less than or equal to 0.001, 0.003, 0.006, 0.01, 0.02, 0.04, 0.6, 0.08, 0.1, 0.2, 0.4, 0.8 or a value in the range between any two of the aforementioned values. Preferably it is between 0.1 and 0.5.

After heat shock, a further treated suspension 211 results which is subject to a separation 24 as described above.

Additional Steps

The suspension 211 obtained in step 5) may optionally be subjected to further enzymatic treatment 22' in order to increase the yield of soluble parts 25'. This is depicted in FIG. 2 as the hatched lines of route 213a.

Thus, according to one embodiment of the invention, the method further comprises the steps of:
  5a) Treating the further treated suspension 211 with one or more degrading enzymes to obtain a further treated suspension 211,
  5b) Optionally repeating step 5a) at least once.

Alternatively, or in addition, the further treated suspension 211 may optionally be subjected to further enzymatic treatment 22', optional ultrasonic 217, separation 24, freezing 27, and heat-shock 210 treatments, in order to increase the yield of soluble parts 25, 25'. This is depicted in FIG. 2 as the hatched lines route 213b. Note the ultrasonic treatment is not depicted in this route, but may be applied to the further treated suspension 211 before during or after enzymatic treatment 22'.

Thus, according to one embodiment of the invention, the method further comprises the steps of:
  5a) Treating 22' the further treated suspension 211 with one or more degrading enzymes,
  5b) Repeating 213b, at least once, steps 3) to 5a) using the further treated suspension 211 of step 5a).

The suspension may be prepared as described above in the case of cocoa powder. The freezing, heat shock, enzymatic treatment, ultrasonic treatment and separation steps may be performed as already mentioned herein.

Should the two schemes described above be implemented together in a method of the invention, they may be applied consecutively.

A5) Method According to a Third Aspect

Figure 3:
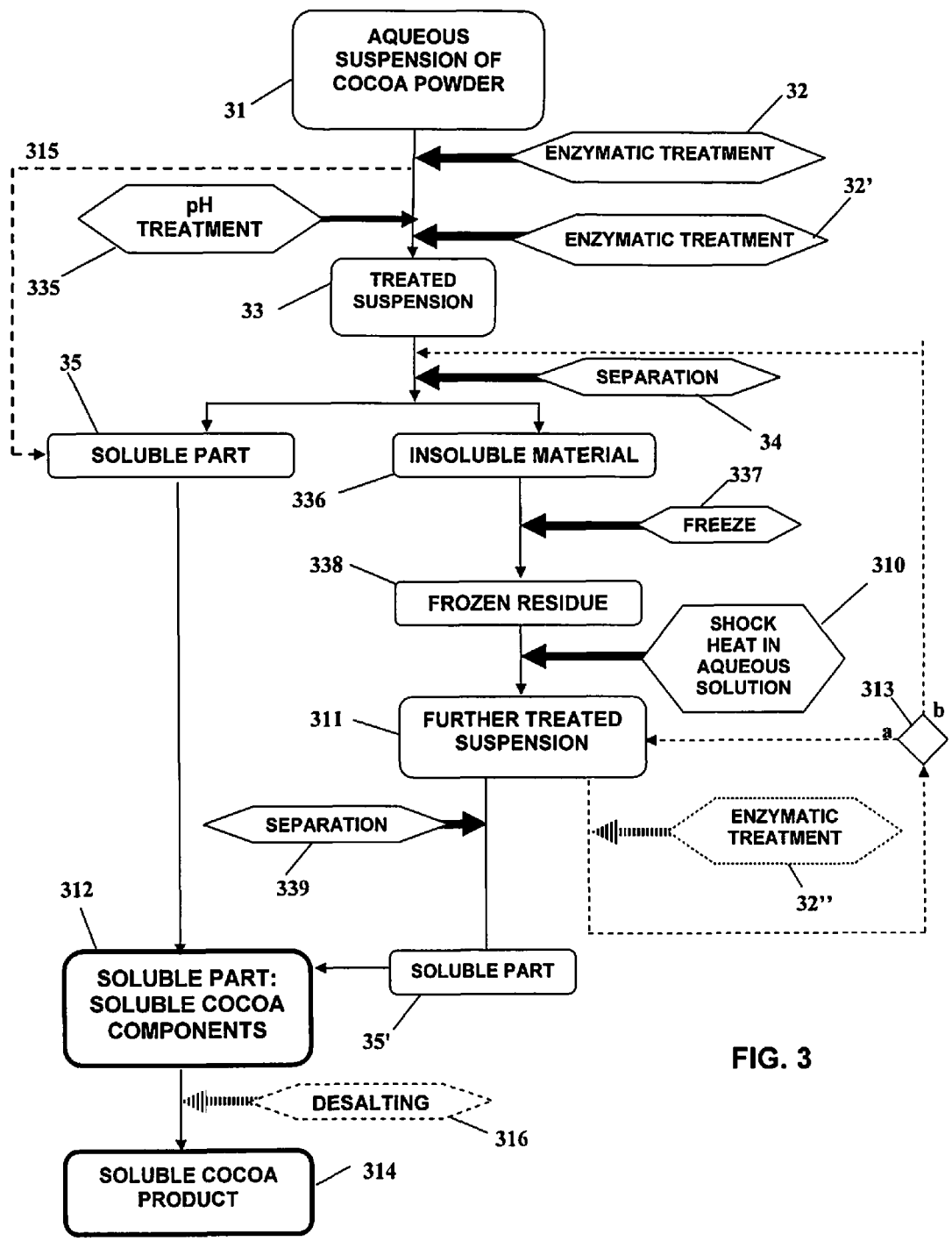
FIG. 3 is a flow chart showing steps of a method according to a third aspect of the present invention.

With reference to FIG. 3, a method according to a second aspect of the present invention is illustrated. The method for producing a soluble cocoa product from cocoa powder comprises the steps:
  a) preparing an aqueous suspension of cocoa powder 31,
  b) treating said suspension with one or more degrading enzymes 32,
  c) submitting 33 the suspension obtained in step b) to a pH treatment 335 comprising treating said suspension for at least 2 hours at a suitable pH, a temperature of at least 100° C., and a pressure which is at least 1 bar higher than the applied pressure,
  d) optionally bringing the pH of the suspension obtained in step c) to a pH value corresponding with the pH of the suspension obtained in step a),
  e) treating 32' the suspension obtained in step c) or d) with one or more degrading enzymes,
  f) separating 34 the suspension 33 obtained in step e) into insoluble material 336 and a soluble part 35, whereby said insoluble material is subjected to the steps of:
    i. Freezing 337 the insoluble material 336,
    ii. Shock heating 310 the frozen insoluble material 338 by contact with hot aqueous solution, to obtain a further treated suspension 311,
    iii. Separating 339 the further treated suspension 311 into insoluble material and a soluble part 35', and
  g) Obtaining soluble cocoa components 312 from the soluble parts 35, 35'.

This method may further comprise the step of desalting 316 the soluble part containing the soluble cocoa components 312, e.g. by means of ion exchange, to remove salts Enzymatic Treatment (32,32')

The method according to the third aspect also comprises a first enzymatic treatment 32 which is carried out on the above-described aqueous suspension of cocoa powder obtained in step a).

The present method according to the third aspect further comprises a second enzymatic treatment 32' which is carried out on the above-described suspension of cocoa powder that has been subjected to a first enzymatic treatment 32 and a pH treatment and that is obtained in step c) or d) of the present method.

The enzymatic treatment steps 32, 32' are carried out as explained for the enzymatic treatment steps 2, 4 of the method according to a first aspect of the invention (see above).

In some embodiments, the enzymatic treatment is repeated more than once e.g. again 32'' after the freezing 337 and heat shock 310 steps.

pH-Pressure Treatment (335)

The suspension that has been enzymatically treated with starch degrading enzyme(s) 32 is submitted to a pH treatment.

The pH-pressure treatment 335 is carried out as explained for the pH-pressure treatment 3 of the method according to a first aspect of the invention (see above).

Heat Shock Treatment

The suspension obtained in step b) can be submitted to a heat shock treatment before being submitted to the above-described pH treatment 335. Heat shock treatment is preferably carried out after the first enzymatic treatment 32. The heat shock treatment is preferably carried out as explained for the method according to a first aspect of the invention (see above). After heat shock, the treated suspension is submitted to a pH treatment 335 as described above.

Ultrasonic Treatment

A step of ultrasonic treatment can optionally be applied to the aqueous suspension of cocoa powder 1. It can be applied before, during or after, but preferably during the pH treatment 335 of step c). This technique does not cause any taste changes to the product or significant molecular changes. The ultrasonic treatment is preferably carried out as explained under the method according to a first aspect of the invention.

Separation (34)

The treated suspension 33 is separated 34 into insoluble material 336 and a soluble part 35. The soluble part 35 comprises the soluble cocoa components 312 together with the aqueous solution. The separation 34 is carried out as explained for the separation 6 of the method according to a first aspect of the invention (see above).

Freezing (337)

The insoluble material 336 obtained after separation 34 is subsequently frozen 337. The freezing step can be achieved by any means. For example, the insoluble material 336 can be placed in a container and put in a freezer or in contact with a freezing substance (e.g. liquid nitrogen, dry ice, freezing gas, freezing aerosol). The freezing should render the insoluble material 336 solid throughout. It is within practices of the skilled person to achieve an insoluble material 336 which is frozen throughout using known techniques. The insoluble material 336 may be frozen 337 to any temperature at 0 deg C. or below i.e. between 0 deg C. and −273.15 deg C. For example, it may be frozen to 0, −1, −2, −5, −10, −15, −20, −25, −30, −35 −40 deg C., or to a temperature in a range between any two of the aforementioned values.

Heat Shock Treatment (310)

After freezing 337, the frozen residue 338 so produced is subject to a heat shock 310 by contacting with hot aqueous solution. This is generally performed by immersion of the frozen residue 338 in hot aqueous solution. The frozen residue 338 is rapidly liquefied, resulting in a further treatable suspension 311. The heat shock treatment 310 is carried out as explained for the heat shock treatment 210 of the method according to a second aspect of the invention (see above). After heat shock, a further treated suspension 311 results which is subject to a separation 34 as described above.

Additional Steps

The suspension obtained after step b) of the present method may optionally be separated into insoluble material and a soluble part 35. This is depicted in FIG. 3 as the hatched line 315. The soluble part 35 comprises the soluble cocoa components 312 together with the aqueous solution. The separation is performed in a similar way as explained for the method according to a first aspect of the invention. The residue that is obtained after this separation can be re-dissolved and further treated according to the present method. The soluble part obtained after treatment of such residue according to steps of the present method can then be combined with the soluble parts that have been separated in an earlier stage of the process.

In another embodiment, the suspension 311 obtained in step ii) may optionally be subjected to further enzymatic treatment 32" in order to increase the yield of soluble parts 35'. This is depicted in FIG. 3 as the hatched lines of route 313a. Thus, according to one embodiment of the invention, the method further comprises the steps of:

ii.1) Treating the further treated suspension 311 with one or more degrading enzymes to obtain a further treated suspension 311, ii.2) optionally repeating step ii.1) at least once.

Alternatively, or in addition, the further treated suspension 311 may optionally be subjected to further enzymatic treatment 32", optional ultrasonic, separation 34, freezing 337, and heat-shock 310 treatments, in order to increase the yield of soluble parts 35, 35'. This is depicted in FIG. 3 as the hatched lines route 313b. Note the ultrasonic treatment is not depicted in this route, but may be applied to the further treated suspension 311 before during or after enzymatic treatment 32".

Thus, according to one embodiment of the invention, the method further comprises the steps of:

ii.1) Treating 32" the further treated suspension 311 with one or more degrading enzymes, and ii.2) Repeating 313b, at least once, steps f) to ii.1) using the further treated suspension 311 of step ii.1).

The suspension may be prepared as described above in the case of cocoa powder. The freezing, heat shock, enzymatic treatment, ultrasonic treatment and separation steps may be performed as already mentioned herein.

Should the two schemes described above be implemented together in a method of the invention, they may be applied consecutively.

A6) Soluble Part Containing Soluble Cocoa Components

The soluble parts 7, 25, 25', 35, 35', resulting from one, two or more separations contain the soluble cocoa components 10, 212, 312.

The obtained product 10, 212, 312 can be used as a material in further processes. It may be freeze-dried, roller-dried or spray dried which procedures are commonly known in the art. The freeze-dried, roller-dried or spray dried product is then a (powdery) soluble cocoa product 14, 214, 314.

Optionally, the soluble part may have undergone desalting 13, 216, 316, e.g. by passing the soluble parts through an ion exchange device. The obtained product is then a (optionally desalted) soluble part containing soluble cocoa components. This material may then be freeze-dried, roller-dried or spray dried which procedures are commonly known in the art. The obtained freeze-dried, roller-dried or spray dried product is then preferably a (powdery) soluble cocoa product (14, 214, 314).

Generally, the spray drying is carried out under usual conditions, with for example a hot-air temperature of between 150 and 270 deg C., and exhaust air temperature of from 80 to 130 deg C.

The particles obtained by spray drying have a substantially spherical shape. The average particle size is from about 20 to 100 micrometers. Generally, when the average particle size is less than 20 micrometers, the solubility is poor, and when it is more than 100 micrometers, the spray-drying efficiency is reduced to an uneconomical level.

The particles may be further subjected to granulation into a granular form of a suitable size. By the granulation, the solubility in water or hot water is further increased, whereby cocoa can be prepared more easily. Conventional granulation methods may be used, but the fluidized bed granulation and agitation granulation methods are especially preferred.

A7) Soluble Cocoa Product

The soluble cocoa product is herein also denoted as "soluble cocoa powder", in order to distinguish from the "cocoa powder" used as starting material in the present methods (see also above).

According to the invention a soluble cocoa product can be obtained having one or more of the following characteristics.

Cocoa powder that is put into and treated according to any of the present methods is made more soluble. Surprisingly, the yield, i.e. the percentage of solubilised starting material, of soluble cocoa exceeds levels from those obtained using standard methods, and with the application of only simple steps. The use of water, especially distilled water, means there is hardly any impact on taste. Similarly, freezing is a natural treatment that appears to solubilise the cocoa without the need for chemicals or renaturation.

In a preferred embodiment, the invention relates to a soluble cocoa product having a degree of solubility in a solvent, preferably in a polar solvent, preferably a water-based solvent of at least 50%, and more preferably of at least 70%, and even more preferably of at least 90% and most preferably of between 95 and 100% or even of between 98 and 100%. Preferably, the obtained soluble cocoa product has a solubility comprised between 50 and 100% and preferably a solubility at a temperature of 20° C. in a polar solvent, for instance an aqueous solvent such as water, milk, an alcohol, an alcoholic drink containing water, etc. of at least 50, 60, 65, 70, 75, 80, 85, 90, 95, 96, 97, 98, 99, 99.5 or of 100%. The present invention provides a soluble cocoa product wherein the amount of insoluble material is lower than 50 weight %, and preferably lower than 40, 35, 30, 25, 20, 15, 10, 5, 4, 3, 2, 1, or 0.5% by weight. Solubility can be measured as defined above.

In a preferred embodiment, the invention provides a soluble cocoa product, whereby said product is in a dry or lyophilized form, and preferably in the form of granules, pellets, or a powder.

In another preferred embodiment, said soluble cocoa product has a theobromine content lower than 5% by fat-free dry weight (i.e. based on a fat-free dry weight) and a caffeine content lower than 1% by fat-free dry weight (i.e. based on a fat-free dry weight). The soluble cocoa product prepared according to the present invention has (based on a fat-free dry weight) a theobromine content lower than 5 wt % and preferably between 2.5 and 5%, and for instance a theobromine content of 2.5, 3.0, 3.5, 4.0, 4.5, 5.0 wt %. The caffeine content will generally be (based on a fat-free dry weight) lower than 1 wt %, and will preferably be between 0.25 and 0.7%, and for instance a caffeine content of 0.25, 0.30, 0.35, 0.40, 0.45, 0.50, 0.55, 0.60, 0.65, or 0.70 wt %. For example, when cocoa powder is made 75% soluble (i.e. a yield of 75% is obtained or 75 wt % of soluble cocoa components is extracted from a cocoa starting powder) by applying a method of the present invention, fat free cocoa powder with 3% theobromine will result in soluble cocoa powder with 4% of theobromine. By contrast, the quantity of theobromine in soluble cocoa powder, coming from a cocoa extract obtained with a prior art technique, will contain at least 5% of theobromine (see for instance example 1 and 7). For example, when cocoa powder is made 40% soluble by applying prior art techniques, fat free cocoa powder with 3% theobromine will result in soluble cocoa powder with 7.5% theobromine.

In accordance with another embodiment, the invention provides a soluble cocoa product having an amount of fat lower than 25 wt %, and for instance lower than 24 wt %, or between 0-20 wt % and for instance between 0-12 wt %, and for instance lower than 10, 8, 5 or 3 wt %. Preferably the fat content of a soluble cocoa product according to the invention is equal to or lower than the fat content of the cocoa starting powder.

In accordance with yet another embodiment, the invention provides a soluble cocoa product wherein proteins in the cocoa starting powder have been degraded to amino acids, peptides, and proteins. Preferably a soluble cocoa product according to the invention has an amount of amino acids, peptides, and proteins (wt % is expressed as % by fat-free dry weight) of between 10 and 40 wt %, and preferably between 12 and 30 wt %, and for instance of 15, 20, 25, or 28 wt %.

In yet another embodiment, the invention provides a soluble cocoa product wherein starch en cellulose in the cocoa starting powder have been degraded to glucose, glucose oligomers and/or dextrines. Preferably a soluble cocoa product according to the invention has an amount of glucose, glucose oligomers and/or dextrines (wt % is expressed as % by fat-free dry weight) comprised between 10 and 60 wt %, and preferably between 15 and 50 wt %, and for instance between 15 and 35 wt %, between 15 and 40% or for instance of at least 10, 15, 20, 25, 30, 35, 40, or 45 wt %.

In yet another embodiment, the invention provides a soluble cocoa product that has an amount of ash (wt % is expressed as % by fat-free dry weight) comprised between 1 and 10 wt % and preferably lower than 8 wt %.

The invention further provides a soluble cocoa product that has an amount of pentosanes (wt % is expressed as % by fat-free dry weight) comprised between 3 and 10 wt % and preferably between 3.5 and 5 wt %.

The invention further provides a soluble cocoa product that has an amount of pectines (wt % is expressed as % by fat-free dry weight) comprised between 0.1 and 3 wt % and preferably between 0.5 and 2 wt %.

The invention further provides a soluble cocoa product that has an amount of polyphenols (wt % is expressed as % by fat-free dry weight) comprised between 1 and 30 wt % or between 1 and 24 wt % and preferably between 5 and 13 wt %, and for instance comprised between 7 and 13 wt %.

The invention further provides a soluble cocoa product that has an amount of organic acids (wt % is expressed as % by fat-free dry weight) comprised between 1 and 5 wt % and preferably between 2 and 4 wt %.

A soluble cocoa product according to the present invention preferably has an amount of phosphatides (wt % is expressed as % by fat-free dry weight) which is lower than 1 wt %.

In a preferred embodiment, a soluble cocoa powder as used herein is a soluble cocoa product in a dry or lyophilized form, and preferably in the form of granules, pellets, or a powder having a solubility at a temperature of 20° C. in an aqueous solvent, e.g. water of at least 90% and preferably of between 95 and 100%, and having:
  an amount of theobromine which is lower than 5% by fat-free dry weight, and for instance between 2.5 and 5% by fat-free dry weight, and
  an amount of caffeine which is lower than 1% by fat-free dry weight, and
  an amount of polyphenols which is comprised between 1 and 24 wt % by fat-free dry weight, and for instance between 7 and 13% by fat-free dry weight, and
  an amount of glucose, glucose oligomers and/or dextrines comprised between 10 and 60% by fat-free dry weight, and for instance between 15 and 40 wt %.

In another preferred embodiment, a soluble cocoa powder applied in the present cocoa-derived material is the soluble cocoa product as disclosed in WO 2008/059064 (PCT/EP2007/062486) which is hereby expressly incorporated by reference in its entirety.

The amount of moisture in the present cocoa product can be adjusted according to techniques well known to the skilled person, and (at least partly) depending on the moisture content of the cocoa starting powder.

In another embodiment the invention provides a soluble cocoa product obtainable by any of the methods as disclosed herein.

In this context, it should be noted that the present soluble cocoa product obtained or obtainable by carrying out a method according to the invention differs from defatted cocoa powder, known in the art, in that it does not form a sediment when dissolved in a suitable solvent, e.g. water or milk. The present invention thus may provide a (at least partially) defatted soluble cocoa product which has not the prior art drawback of sedimentation of known defatted cocoa powders.

A8) Beverage Pouch, Pre-Concentrate and Beverages

In one embodiment, the invention provides a pre-concentrate comprising a soluble cocoa product according to the present invention.

For instance, the invention provides a pre-concentrate comprising a soluble cocoa product as defined herein, whereby said pre-concentrate is in a liquid form, preferably in the form of a syrup or solution, or in a solid form, preferably in the form of a dry or lyophilized (freeze-dried) form, and for instance in the form of granules, pellets, or a powder, and whereby said pre-concentrate preferably comprises between 0.1 and 100 wt %, and preferably between 0.1 and 50 wt % of said soluble cocoa product.

In one embodiment, the invention relates to a pre-concentrate, preferably a pre-concentrate in a liquid form (e.g. a syrup) comprising a mixture of:
- a soluble cocoa product according to the invention, preferably in an amount of between 0.1 and 50 wt %
- a sugar, such as e.g. sucrose, dextrose, maltose, fructose, lactose, and brown and invert sugars, alone or in combination, preferably in an amount of between 0.1 and 75 wt % and preferably of between 0.1 and 50 wt % and/or a sweetener, preferably in an amount of between 0.0001 and 25 wt %
- optionally a suitable amount of milk or (optionally gaseous) water.

In another embodiment, the invention relates to a pre-concentrate, preferably a pre-concentrate in a solid form, and even more preferred in a freeze-dried form, comprising a mixture of
- a soluble cocoa product according to the invention, preferably in an amount of between 0.1 and 50 wt %
- a sugar, such as e.g. sucrose, dextrose, maltose, fructose, lactose, and brown and invert sugars, alone or in combination, preferably in an amount of between 0.1 and 75 wt % and preferably of between 0.1 and 50 wt % and/or a sweetener, preferably in an amount of between 0.0001 and 25 wt %
- optionally a suitable amount of milk.

The present pre-concentrate can be used as a base for preparing a drink, by adding water, milk or an alcohol-water mixture. In an example, a drink can be prepared by combining between 10 and 45 wt % of a pre-concentrate as defined herein with 55 to 90 wt % of a suitable solvent such as water, milk or an alcohol-water mixture.

In another embodiment, the invention provides a beverage pouch comprising a soluble cocoa product or a pre-concentrate according to the invention. One application for the invention is the treated cocoa product, or a pre-concentrate thereof for use in a filter pouch for beverage purposes. This pouch comprises the cocoa product or a pre-concentrate and can be used to make a chocolate drink when hot water or milk is poured on it. The same system is already being used in coffee and tea pouches e.g. pre-prepared coffee filters and pads. The reason why cocoa pouches have not been manufactured up to now is that cocoa does not sufficiently dissolve to be used in the same way as coffee or tea-pouches.

Wet cocoa powder forms clumps meaning it cannot pass through the patch. The present invention solves this problem.

In another embodiment, the invention relates to a drink or beverage containing a soluble cocoa product or a pre-concentrate according to the invention. The terms "drink" and "beverage" are interchangeably used herein.

Generally, the soluble cocoa product concentrations in the final beverage are about 1% to about 35%, or about 1% to about 20%, or about 1% to about 10%, or about 1% to about 5%. It will be understand that many other ranges or specific beverages can be selected and used. The drinks or beverages according to the present invention have an improved taste. Furthermore, a cocoa product contained in said beverages will not sediment.

Beverages according to the present invention may comprise hot or cold drinks. In preferred and advantageous embodiments, the beverages are selected from the group comprising but not limited a water-based or milk-based drink; a carbonated drink; a reconstituted beverage, etc. . . . .

In one embodiment, a soluble cocoa product or pre-concentrate as defined herein can be added to water or milk to produce a water-based or milk-based drink.

In one embodiment the invention provides a beverage which is a carbonated drink comprising a soluble cocoa product as defined herein or a pre-concentrate in liquid or solid form as defined herein and a suitable amount of carbonated water and/or carbon gas. Preferably, the invention provides a beverage which is a carbonated drink comprising a pre-concentrate, and preferably a liquid pre-concentrate, as defined herein and carbonated water. In another embodiment, the invention provides a beverage which is a carbonated drink comprising a pre-concentrate, and preferably a liquid pre-concentrate as defined herein, and a suitable amount of carbon gas ($CO_2$). In another embodiment, the invention provides a beverage which is a carbonated drink and which comprises a suitable amount of a soluble cocoa product as defined herein and a suitable amount of carbonated water and/or a suitable amount $CO_2$ gas.

In one embodiment the invention provides a beverage which is a reconstituted drink comprising a soluble cocoa product as defined herein or a pre-concentrate in solid, and preferably a freeze-dried form as defined herein and a suitable amount of water and/or milk. A "reconstituted drink" as defined herein as a drink which is obtained when reconstituting a preferably freeze-dried cocoa product or pre-concentrate in water and/or milk.

Beverages or pre-concentrates as defined according to the present invention may optionally contain further ingredients, such as but not limited to vitamins, flavoring agents, coloring agents and/or extracts, e.g. plant and/or fruit extracts.

Available nutritive or carbohydrate sweeteners that can be selected and used in a pre-concentrate or a beverage according to the present invention include but are not limited to for instance sucralose, aspartame, saccharin, stevioside, and preferably comprise sucralose. the beverages, alone or in any combination, include sucrose, dextrose, fructose, liquid fructose, lactose, maltose, glucose, trehalose, oligofructose, inulin, agave syrup, corn syrup, invert sugar, honey, cane syrup, maple sugar, brown sugar, and molasses, for example. Furthermore, artificial or non-nutritive sweeteners can be used in the invention, or in total or partial replacement of nutritive sweeteners, to produce low calorie or low carbohydrate products or sugar-free products. Examples of sweeteners include, but are not limited to, Acesulfame potassium (Ace-K), sucralose, maltitol, xylitol, erythritol, mannitol, sorbitol, lactitol, isomaltulose, powdered hydrogenated glucose syrup, aspartame, neotame, cyclamate, saccharine, glycyrrhizine, dihydrochalcones, stevisoide, thaumatin, monellin, neohesperidine, any of the polyol compounds, and any available natural products of plants, such as glycosides and specifically stevioside and rebaudioside A, and any combination of two or more of these sweeteners. A preferred polyol or sugar alcohol is xylitol, but any others can be selected, alone or in any of various combinations possible, from, for example, erythritol, mannitol, sorbitol, and maltitol. Sugar substitutes, as known and available in the art, can also be used, alone or in various combinations.

Vitamins that may be used in a beverage or pre-concentrate according to the present invention include but are not limited to for instance vitamin C, vitamin D or vitamin E.

Extracts, e.g. plant or fruit extracts, that may be used in a beverage or pre-concentrate according to the present invention include but are not limited to for instance juices, concentrates, or extracts, as well as any combination of two or more thereof, such as citrus fruits; berries; orange; lemon; lime; tangerine; mandarin; grapefruit; acerola; grape; pear; passion fruit; pineapple; banana; apple; cranberry; cherry; raspberry; chokeberry; grapeseed; peach; plum; grape; currant; black currant; cranberry; blackberry; blueberry; pomegranate; acai; noni; elderberry; goji berry; rosehips; bilberry; hawthome berry; ginko; goru kola; rooibos; boysenberry; catuaba; horny goat weed; yohimbe; damiana; red raspberry leaf; vitex berry; blessed thistle; wolfberry; strawberry; mirabelle; watermelon; honeydew; cantaloupe; mango; papaya; botanical flavors derived from cola; tea; white tea; green tea; coffee; vanilla; almond; vegetables; tomato; cabbage; celery; cucumber; spinach; carrot; lettuce; watercress; dandelion; rhubarb; beet; cocona; cocoa; guava; Japanese knotweed; han guo, green tea, white tea, and any available tea blends, grapeseed, blueberries, etc. . . . .

Flavoring agents that may be used in a beverage or pre-concentrate according to the present invention include but are not limited to flavor agents and beverage flavor agents known or available and for instance vanillin, coumarin, and other compounds available in the art.

Coloring agents that may be used in a beverage or pre-concentrate according to the present invention include but are not limited to such as e.g. β-carotene, annatto, preservatives such as e.g. sodium- or calciumpropionate, sulphite ammonia caramel, or any combinations thereof.

Additional ingredients may still be added to a beverage or pre-concentrate according to the present invention including but are not limited to caffeine, guarana, taurine, etc. . . . .

Some of the preferred beverages and pre-concentrates are low calorie products, and thus sugar substitutes and sweeteners are preferred, especially in producing products with a per serving calorie count of less than or about 100 calories, or less than or about 70 calories, or less than or about 60 calories, or less than or about 50 calories, or less than or about 40 calories, or less than or about 30 calories, or substantially zero calories.

Preservatives and similar functional compounds and compositions and stabilizing agents, emulsifiers or beverage stabilizers, can also be used in the beverages and pre-concentrates as defined herein, or in mixing pre-concentrates into a ready-to-drink beverage.

Beverages according to the present invention can be prepared by techniques which are well known in the art.

A9) Applications/Uses

This soluble cocoa powder or cocoa product can be used in numerous applications, in particular in all applications where cocoa powder or other vegetable components containing plant cells are required to be more soluble in aqueous environments, such as in chocolate milk and other beverages, ice-creams and desserts. The sedimentation of insoluble cocoa material can be greatly reduced and even avoided.

A cocoa product prepared according to the method is made more soluble with fast and inexpensive additional steps. Surprisingly, the yield (the percentage of solubilised starting material) of soluble cocoa exceeds levels obtained using standard methods, and with the application of only simple steps, and without the need of having to repeat one or more method steps. The use of water, especially distilled water, means there is hardly any impact on taste. Similarly, freezing is a natural treatment that appears to solubilise the cocoa without the need for chemicals or renaturation. Theoretically, it could be possible to make defatted cocoa powder 100% soluble in aqueous solutions.

The present process can also be applied to other industries where a soluble part needs to be extracted from cellular material. The present invention can in fact be used in any application where plant cells have to be disrupted. The present method may for instance be applied to solubilize other types of plant material such as fruits and vegetables. For example, fruit juices and vegetable juices can be readily prepared from a powdered form prepared according to the present invention.

Another application is the paper industry. This technique can be used to make more excellent surface smoothness, printing suitability, liquid paper.

More in particular, cocoa-derived materials, beverages and frozen products such as ice creams prepared with a soluble cocoa product as defined herein will now be discussed in more detail below.

B) Cocoa-Derived Materials and Beverages

In another aspect, the present invention relates to cocoa-derived materials and beverages and methods for preparation thereof.

B1) Cocoa-Derived Material

In an aspect, the present invention relates to a cocoa-derived material. The cocoa-derived material may be in a liquid form, such as in the form of a solution or syrup, or a solid form, for instance in a freeze-dried powder form.

In the present context, the terms "cocoa-derived material" or "cocoa-derived composition" are used herein as synonyms and are intended to refer to a material or composition in concentrated form which is preferably to be further diluted, e.g. in a liquid, or alternatively used as such.

The cocoa-derived material according to the invention comprises a soluble cocoa powder and a cocoa extract, whereby said extract comprises more than 25% by weight based on the extract of polyphenols. Polyphenols are bioactive substances derived from plant materials and are closely associated with the sensory and nutritional quality of products derived from these plant materials. The term "cocoa polyphenol" as used herein is intended to include polyphenolic products, including proanthocyanidins, and more particularly procyanidins, extracted from cocoa beans and derivatives thereof.

In a preferred embodiment the weight ratio of soluble cocoa powder to cocoa extract in a cocoa-derived material according to the invention is comprised between 3:1 and 1:3 and preferably between 2:1 and 1:2, and preferably is 1.

In another preferred embodiment said cocoa-derived material according to the invention, further comprises one or more additional ingredients selected from the group comprising sugars, sweeteners, caffeine, vitamins, flavouring agents and colouring agents. Other additional ingredients may still be added to a material according to the present invention including but not limited to guarana, taurine, and other compounds available in the art. In this context it is noted that these additional ingredients refer to ingredients that are not derived from or obtained from cocoa beans but that are added to the cocoa-derived material according to the invention.

Sugars that can be added to a cocoa-derived material according to the present invention may comprise but are not limited to sucrose, dextrose, maltose, fructose, lactose, brown and invert sugars and other compounds available in the art alone or in combination.

Available nutritive or carbohydrate sweeteners that can be selected and added to a cocoa-derived material according to the present invention include but are not limited to for instance sucralose, aspartame, saccharin, stevioside and other compounds available in the art and preferably comprise sucralose. The beverages, alone or in any combination, include sucrose, dextrose, fructose, liquid fructose, lactose, maltose, glucose, trehalose, oligofructose, inulin, agave syrup, corn syrup, invert sugar, honey, cane syrup, maple sugar, brown sugar, molasses and other compounds available in the art, for example. Furthermore, artificial or non-nutritive sweeteners can be used in the invention, in total or partial replacement of nutritive sweeteners, to produce low calorie or low carbohydrate products or sugar-free products. Examples of sweeteners include, but are not limited to, Acesulfame potassium (Ace-K), sucralose, maltitol, xylitol, erythritol, mannitol, sorbitol, lactitol, isomaltulose, powdered hydrogenated glucose syrup, aspartame, neotame, cyclamate, saccharine, glycyrrhizine, dihydrochalcones, stevisoide, thaumatin, monellin, neohesperidine, any of the polyol compounds, any available natural products of plants, such as glycosides and specifically stevioside and rebaudioside A, other compounds available in the art and any combination of two or more of these sweeteners. A preferred polyol or sugar alcohol is xylitol, but any others can be selected, alone or in any of various combinations possible, from, for example, erythritol, mannitol, sorbitol, and maltitol. Sugar substitutes, as known and available in the art, can also be used, alone or in various combinations.

Vitamins that may be used in a cocoa-derived material according to the present invention may include but are not limited to for instance vitamin C, vitamin D, vitamin E or other compounds available in the art.

Flavouring agents that may be used in a material according to the present invention include but are not limited to for instance flavor agents and beverage flavor agents known or available and for instance vanillin, coumarin, and other compounds available in the art.

Coloring agents that may be used in a material according to the present invention include but are not limited to for instance β-carotene, annatto, preservatives such as e.g. sodium- or calciumpropionate, sulphite ammonia caramel, E150d, other compounds available in the art or any combinations thereof.

Syrup

In a first embodiment said cocoa-derived material is in a liquid form. In an embodiment, said cocoa-derived material is a syrup.

In an embodiment, a syrup according to the invention comprises up to 25 wt % of a soluble cocoa powder as defined herein and up to 25 wt % of a cocoa extract as defined herein. In a preferred embodiment said syrup comprises between 0.25 and 5 wt % of a soluble cocoa powder as defined herein and between 0.25 and 5 wt % of a cocoa extract as defined herein. Preferably said syrup comprises between 0.5 and 3 wt %, and more preferably between 0.75 and 1.75 wt % of said soluble cocoa powder, and between 0.5 and 3 wt % and more preferably between 0.75 and 1.75 wt % of said cocoa extract.

In an embodiment, said syrup comprises an amount of polyphenols between 0.05 and 1.5%, and preferably between 0.2 and 0.7% by weight of said syrup.

In another embodiment, the weight ratio of soluble cocoa powder to cocoa extract in a syrup according to the invention is comprised between 3:1 and 1:3 and for instance is comprised between 2:1 and 1:2, or is equal to 1.

In another preferred embodiment said syrup comprises a liquid which may be a water-based or aqueous solvent such as but not limited to water, milk, an alcohol, in an amount of less than 80% by weight of said syrup preferably in an amount of less than 50% by weight of said syrup. In an embodiment, said syrup comprises a liquid such as water, preferably carbonated water, in an amount of less than 80% by weight of said syrup preferably in an amount of less than 50% by weight of said syrup, and for instance less than 45, 40, 35, 33, 30, 28, 26, 25, 24, 23, 22, 21, 20, or 18% by weight of said syrup.

In another preferred embodiment said syrup according to the invention, further comprises one or more additional ingredients selected from the group comprising sugars, sweeteners, caffeine, vitamins, flavouring agents and colouring agents.

In a preferred embodiment said additional ingredient is a sugar and/or a sweetener. Preferably the invention provides a cocoa-derived material wherein said additional ingredient is a sugar provided in an amount of less than 80, and for instance less than 70, 60, 50, 40, 35, 30, 25, 20, 15, 10% by weight of said syrup. Alternatively or in combination therewith the invention provides a cocoa-derived material wherein said additional ingredient is a sweetener provided in an amount of less than 80, and for instance less than 70, 60, 50, 40, 35, 30, 25, 20, 15, 10, 1, 0.1, 0.01% by weight of said syrup. The amount of sweetener added to the cocoa-derived material depends largely on the sweetness of the used sweetener. This factor is known by a person skilled in the art.

In another preferred embodiment said additional ingredient is caffeine, preferably provided in an amount of between 0.005 and 7% by weight of said syrup, preferably between 0.005 and 0.7% by weight of said syrup, and more preferably between 0.01 and 0.1% by weight of said syrup.

In further embodiments, a cocoa-derived material according to the invention in syrup form comprises the following characteristics. A syrup according to the present invention has a pH of less than 5, preferably less than 4 most preferably having a pH of between 3.0 and 3.5. pH of the present cocoa-derived material can be adjusted with organic acids. Examples of organic acids include but are not limited to $H_2CO_3$, $H_3PO_4$, other compounds available in the art and combinations thereof. The low pH of the syrup provides a microbiologically stable environment that contributes to a longer storing period and extended shelf life.

In addition a syrup according to the present invention has an Oxygen Radical Absorbance Capacity (ORAC) value between 10 and 500 μmol Trolox Equivalents (TE) per gram syrup and preferably between 50 and 250 μmol TE per gram syrup and more preferably between 70 and 150 μmol TE per gram syrup. The ORAC value provides a measurement of the antioxidant capacities of the composition and higher ORAC values are known in the art to have beneficial effects on the health.

Techniques for measuring ORAC values are well known to a person of skill in the present art and will therefore not be disclosed into detail herein.

Powder Composition

In a second embodiment a cocoa-derived material is provided, wherein said material is in a dry or lyophilized form, and preferably in the form of granules, pellets, or a powder. In an embodiment said cocoa-derived material is in a dried form and consists of a powder composition. The term "powder composition" or "cocoa powder composition" as used herein refers to a powdery product, e.g. in the form of granules, pellets, or a powder, which contains substances or materials that are obtained from cocoa beans.

In a preferred embodiment said powder composition comprises between 0.01 and 75 wt % of a soluble cocoa powder as defined herein and between 0.01 and 75 wt % of a cocoa extract as defined herein. Preferably said powder composition comprises between 0.1 and 50 wt % of said soluble cocoa powder, and between 0.5 and 30 wt % and more preferably between 0.75 and 10 wt % of said cocoa extract.

In another embodiment, the weight ratio of soluble cocoa powder to cocoa extract in a powder composition according to the invention is comprised between 3:1 and 1:3 and for instance is comprised between 2:1 and 1:2, or is equal to 1.

Preferably said powder composition has a degree of solubility in a solvent, preferably in a polar solvent, preferably a water-based solvent of at least 50%, and more preferably of at least 70%, and even more preferably of at least 90% and most preferably of between 95 and 100% or even of between 98 and 100%. More in particular, the present powder composition has a solubility at a temperature of 20° C. in a polar solvent, for instance an aqueous solvent such as water, milk, an alcohol, or mixtures thereof of at least 50%, at least 70%, or at least 90%.

In another preferred embodiment said powder composition according to the invention, further comprises one or more additional ingredients selected from the group comprising sugars, sweeteners, caffeine, vitamins, flavouring agents and colouring agents.

In a preferred embodiment said additional ingredient is a sugar and/or a sweetener. Preferably the invention provides a powder composition wherein said additional ingredient is a sugar provided in an amount of less than 80, and for instance less than 70, 60, 50, 40, 35, 30, 25, 20, 15, 10% by weight of said powder composition. Alternatively or in combination therewith the invention provides a cocoa-derived material wherein said additional ingredient is a sweetener provided in an amount of less than 80, and for instance less than 70, 60, 50, 40, 35, 30, 25, 20, 15, 10, 1, 0.1, 0.01% by weight of said powder composition. In another preferred embodiment said additional ingredient is caffeine, preferably provided in an amount of between 0.005 and 0.7% by weight of said powder composition.

In addition a powder composition according to the present invention may have an ORAC value between 10 and 10000 µmol TE per gram powder, and for instance between 15 and 8000, between 30 and 5000, between 50 and 3000, between 100 and 500, or between 150 and 300 µmol TE per gram powder.

In another embodiment, for instance when using a sweetener, a powder composition according to the present invention may have an ORAC value between 10 and 10000 µmol TE per gram powder, and for instance between 100 and 8000, between 500 and 6000, between 1000 and 5000, between 2000 and 4000, or between 2500 and 3500 µmol TE per gram powder.

In further embodiments, a powder composition according to the invention can be agglomerated using methods known by a skilled person. By agglomerating the powder composition according to the invention the instant solubility of the powder is improved.

A soluble cocoa powder and cocoa extract applied in a cocoa-derived material according to the present invention will now be characterised in more detail above and below.

Cocoa Extract

The extract applied in the cocoa-derived material can comprise a non-purified as well as a purified and/or concentrated extract.

Said cocoa extract preferably is a solvent-derived extract. The term "solvent-derived" as used herein refers to an extract of cocoa that is obtained using as solvent a mixture of water and an organic solvent, e.g. a water miscible organic solvent, an alcohol, ethanol, acetone, 2-butanol, or 2-propanol, in the extraction procedure. Preferably said solvent is ethanol and water, acetone and water, 2-butanol and water or 2-propanol and water.

In a preferred embodiment, said cocoa extract has an elevated level of polyphenols, and preferably comprises more than 25% by weight based on the extract of polyphenols. In a preferred embodiment, said cocoa extract has between 25 and 75%, more preferably between 25 and 65% by weight of polyphenols, and for example more than 25, 30, 35, 40, 45, 50, 55, 60 or 65% by weight of polyphenols.

In an embodiment, a cocoa extract as used herein comprises between 25 and 75%, more preferably between 25 and 65% by weight of polyphenols, or for instance between 35 and 65% or between 40 and 55% of polyphenols. These can be analysed by Folin Ciocalteu method and expressed as epicatechin.

Said polyphenols comprise between 5 and 15% or between 5 and 10% by weight of the extract of polyphenol monomers and more than 10%, or for instance more than 20% or more than 30% by weight of the extract of one or more polyphenol oligomers.

In another embodiment, a cocoa extract as used herein comprises monomers, whereby said monomers comprise between 5 and 15%, by weight of the extract of epicatechin and between 0.5 and 5% by weight of the extract of catechin. In another embodiment, the monomers present in the cocoa extract comprise between 6 and 10% by weight of the extract of epicatechin, and between 1 and 4% by weight of the extract of catechin.

The term "oligomers" is used herein to refer to compounds having more than one monomer unit. In another embodiment, a cocoa extract as used herein comprises oligomers wherein said oligomers comprise dimer(s), trimer(s), tetramer(s), pentamer(s), hexamer(s), heptamer(s), octamer(s), nonamer(s) and/or decamer(s). In another embodiment, said oligomers further comprise oligomers having more than ten monomer units and may comprise undecamer(s), dodecamer(s), tridecamer(s), tetradecamer(s), pentadecamer(s), hexadecamer(s), heptadecamer(s), octadecamer(s), nonadecamer(s), eicosmer(s), etc.

In another embodiment, a cocoa extract as used herein comprises (% by weight of the extract): between 5 and 15% by weight, and preferably between 6 and 10% by weight of dimer(s), between 5 and 15% by weight, and preferably between 6 and 10% by weight of trimer(s), between 2.5 and 10% by weight, and preferably between 4 and 9% by weight of tetramer(s), between 2.5 and 10% by weight, and preferably between 4 and 9% by weight of pentamer(s), between 2.5 and 10% by weight, and preferably between 4 and 9% by weight of hexamer(s), between 0.5 and 5% by weight, and preferably between 1 and 3% by weight of heptamer(s), between 0.5 and 5% by weight, and preferably between 0.5 and 3% by weight of octamer(s), between 0.5 and 5% by weight, and preferably between 1 and 3% by weight of nonamer(s), and/or between 0.1 and 3% by weight, and preferably between 0.1 and 1% by weight of decamer(s). In another embodiment, a cocoa extract as used herein comprises more than 3% by weight of the extract, and preferably more than 5% by weight of the extract, and even more preferred more than 8% by weight of the extract of one or more oligomers having more than 10 monomer units, and including but not limited to undecamer(s), dodecamer(s), tridecamer(s), tetradecamer(s), pentadecamer(s), hexadecamer(s), heptadecamer(s), octadecamer(s), nonadecamer(s), eicosmer(s), etc. . . . .

A cocoa extract as used herein may comprise additional components such as but not limited to ash(es), one or more alkaloid(s), one of more fat(s), one or more sugar(s) and/or sugar alcohol(s), one or more protein(s), one or more fiber(s) and moisture, e.g. water, and any combinations thereof.

In an embodiment, a cocoa extract as used herein comprises between 5 and 15% or between 8 and 12% by weight of one or more alkaloid(s). Preferably said alkaloids comprise but are not limited to xanthines and/or theobromines. In an embodiment, a cocoa extract as used herein comprises less than 10%, or less than 5% by weight of xanthines. In another embodiment, a cocoa extract as used herein comprises less than 10%, or less than 5% by weight of theobromine.

In another embodiment, a cocoa extract as used herein comprises between 5 and 15% by weight or between 8 and 12% by weight of one or more sugar(s) and/or sugar alcohol(s). Preferably said sugars may comprise but are not limited to fructose and/or glucose. Said sugar alcohol may comprise but is not limited to mannitol.

In yet another embodiment, a cocoa extract as used herein comprises between 8 and 25% or between 15 and 25% or between 17 and 21% by weight of one or more protein(s). The term proteins may include but is not limited to peptides, oligopeptides, polypeptides, amides, polyamides, enzymes, etc. . . . . .

In another embodiment, a cocoa extract as used herein comprises between 3 and 10%, or between 3 and 8% by weight of one or more fiber(s). Preferably said fibers may comprise but are not limited to pectin, cellulose, hemi-cellulose and/or lignin.

In yet another embodiment, a cocoa extract as used herein comprises between 0.5 and 5%, or between 1 and 3% by weight of one or more fats. Preferably said fat consists of cocoa fat.

The present cocoa extract may be in any type of formulation, for instance in a liquid or in a dry or lyophilized form. In an example, the present cocoa extract may be in the form of a powder, an uncompressed powder, a semi-compressed powder, a granule, a pellet, a tablet, a granulate, a small particle, a capsule, etc. It shall be clear that a skilled person will understand what is meant with these types of formulations.

In a preferred embodiment, a cocoa extract applied in the present cocoa-derived material is a cocoa extract as disclosed in WO 2007/082703 which is incorporated herein by reference.

A cocoa extract applied in the present cocoa-derived material as defined above can be obtained by methods known in the art such as for instance the ones disclosed in WO 02/14251, which is incorporated herein by reference.

Cocoa extracts obtained by the methods as indicated in WO 02/14251 may be further extracted with $CO_2$ and a suitable co-solvent, e.g. ethanol, as for instance described in WO 2007/082703.

More in particular, a cocoa extract applied in the present cocoa-derived material is preferably obtained or obtainable by extraction of non-defatted cocoa beans, preferably of non-fermented and non-defatted cocoa beans.

In an example, a cocoa extract as used in the present invention is prepared by using fresh beans, pre-treated or not pre-treated, having the pulp and the shell removed by a pulp removal and shelling operation. Clean kernels can thus be obtained which are then ground, for example in a cutting mill, in the presence of a solvent, such as for instance water, ethanol, acetone, 2-butanol, 2-propanol, in all proportions, mixed with water. Preferably, the solvent content is greater than 50% by volume (taking into account the water contributed by the beans). The ground kernel/solvent mixture can be left to infuse from a few hours to several days and can be either hot or cold. If this infusion is carried out hot, temperatures which are too high should be avoided (i.e. greater than 60° C.), in order to limit chemical oxidation and chemical degradation of the compounds to be extracted. The mixture can then be filtered and rinsed several times using the solvent employed. Distillation can then be carried out to obtain an extract. This distillation is preferably carried out at a temperature of 50 to 60° C. in order to avoid degradation of the polyphenol compounds, under a residual pressure of 12 to 20 Kpa to evaporate the mixture of solvents contained in the filtrate.

Alternatively, a cocoa extract as used in the present invention may be prepared by the above-indicated process, but starting from commercial cocoa beans that have undergone drying as a pre-treatment. The obtained dried kernels can then be subjected to a rehumidification stage after shelling for instance with 30 to 50% warm water, before the grinding stage in the solvent. Such rehumidification allows the cell walls of the kernels to regain their elasticity and to therefore not be ruptured during grinding in the presence of the solvent.

Soluble Cocoa Powder

According to the invention a soluble cocoa powder as used in a cocoa-derived material as defined herein has one or more of the characteristics of the soluble cocoa powder as defined above, e.g. in section A7).

It can be noted that the soluble cocoa powder applied in the present cocoa-derived material differs from defatted cocoa powder, known in the art, in that it does not form a sediment when dissolved in a suitable solvent, e.g. water or milk. The present invention thus provides a cocoa-derived material comprising an (at least partially) defatted soluble cocoa product which has not the prior art drawback of sedimentation of known defatted cocoa powders.

A soluble cocoa powder applied in the present cocoa-derived material, either syrup or powder composition, is preferably prepared by a method as schematically illustrated in FIG. 1 which is a flow chart showing steps of a method for preparing a soluble cocoa product applied in a cocoa-derived material and beverage according to the invention. This method is explained above.

B2) Method for Preparing a Cocoa-Derived Material According to the Invention

In another aspect, the invention relates to a method for preparing a cocoa-derived material according to the invention.

In one embodiment a method is provided for preparing cocoa-derived material which is in the form of a syrup. Such method comprises the steps of a) Mixing a soluble cocoa powder with a cocoa extract as defined herein and comprising more than 25% by weight of polyphenols, and preferably more than 25, 30, 35, 40, 45, 50, 55, 60 or 65% by weight of polyphenols, based on the extract, b) Optionally admixing one or more additional ingredients, to the mixture of step a), c) Solubilizing the mixture of step a) or b) in water, d) Adjusting the pH of the suspension obtained in step c) to a pH value of less than 5, preferably less than 4 and most preferably less than 3.5, e) Optionally homogenizing said mixture, preferably at a pressure of at least 100 bar, and preferably between 150 and 200 bar and at a temperature of at least 70° C., most preferably at 85° C.

f) Optionally pasteurizing the mixture of step d) or e) preferably at a temperature of at least 80° C. for at least 20 seconds, and g) Cooling the mixture of step d), e) of f) to a temperature of at least −20° C. for at least 1 minute, h) Optionally admixing one or more additional ingredients, to the mixture of step g), i) Optionally carbonating the mixture.

The carbonation of the cocoa-derived material can be performed using any methods known in the art and for instance by adding $H_2CO_3$ to the cocoa-derived material.

In another embodiment, a method is provided for preparing cocoa-derived material which is in the form of a powder composition. Such method comprises the steps of:

a) Mixing a soluble cocoa powder with a cocoa extract comprising more than 25% 25% by weight of polyphenols, and preferably more than 25, 30, 35, 40, 45, 50, 55, 60 or 65% by weight of polyphenols, based on the extract, b) Optionally admixing one or more additional ingredients to the mixture of step a), and c) drying said mixture.

The obtained product can be freeze-dried, roller-dried, spray-dried or vacuum dried which procedures are commonly known in the art.

In another embodiment a cocoa-derived material of the present invention is obtained by dry mixing the ingredients as described in the present application.

The above-defined methods are further characterised in that in step a) said soluble cocoa powder and said cocoa extract are mixed in a weight ratio which is comprised between 3:1 and 1:3 and preferably between 2:1 and 1:2, and which preferably is 1.

B3) Beverages

In yet another embodiment, the invention relates to a beverage or drink comprising a cocoa-derived material according to the invention. The terms "drink" and "beverage" or "cocoa-derived beverage" or "cocoa-derived drink" are interchangeably used herein. Beverages according to the present invention may comprise hot or cold drinks. In preferred and advantageous embodiments, the beverages are selected from the group comprising but not limited to a water-based or milk-based drink; a carbonated drink; a reconstituted beverage, etc. and preferably a carbonated drink.

In one embodiment, a cocoa-derived material as defined herein, either in syrup or in powder form can be added to water or milk to produce a water-based or milk-based drink. Preferably a beverage according to the present invention is a water-based drink.

In a particularly preferred embodiment the invention provides a cocoa-derived beverage comprising between 0.01 and 30% by weight of a cocoa-derived material and for instance between 0.5 and 20% by weight or between 5 and 30% by weight or between 10 and 30% by weight of a cocoa-derived material, and between 70 and 99.99% by weight of a liquid and for instance between 80 and 99.5% by weight or between 70 and 99.5% by weight or between 70 and 90% by weight of a liquid, preferably water, most preferably carbonated water, wherein said cocoa-derived material comprises a soluble cocoa powder and a cocoa extract, whereby said cocoa extract comprises more than 25% by weight and preferably more than 25, 30, 35, 40, 45, 50, 55, 60 or 65% by weight of polyphenols, based on the extract. Preferably said cocoa-derived material is as defined above. The present cocoa-derived material may be provided in liquid or solid form as defined herein and mixed with a suitable amount of water.

Preferably, the invention provides a beverage which is a carbonated drink comprising a syrup as defined herein and carbonated water. In another embodiment, the invention provides a beverage which is a carbonated drink comprising a syrup as defined herein and a suitable amount of carbon dioxide ($CO_2$). In yet another embodiment, the invention provides a beverage which is a carbonated drink and which comprises a suitable amount of a soluble cocoa powder as defined herein, a suitable amount of a cocoa extract with elevated polyphenols content, preferably of at least 25 wt % based on the extract, as defined herein, and a suitable amount of carbonated water or carbon dioxide ($CO_2$).

The carbonation of the cocoa-derived beverage can be performed using any methods known in the art and for instance by adding $H_2CO_3$ to a cocoa-derived material.

In one embodiment the invention provides a cocoa-derived pre concentrate comprising between 10 and 99 wt %, preferably between 10 and 30 wt %, most preferably 15 wt % of a cocoa-derived material as defined herein and between 1 and 90 wt %, preferably between 70 and 90 wt % and most preferably 85 wt % of carbonated water. Preferably said beverage is a carbonated cocoa-derived beverage. Generally concentrations of soluble cocoa powder in the final carbonated beverage are comprised between 0.01% and 35 wt %, or between 0.05% and 10 wt %, or between 0.1% and 5 wt %. Generally concentrations of cocoa extract as defined herein in the final carbonated beverage are between 0.01% and 35 wt %, preferably between 0.05% and 10 wt %, and more preferably between 0.1% and 5 wt %.

According to another embodiment, a beverage is provided further comprising one or more additional ingredients such as vitamins, flavouring agents and/or colouring agents.

In another preferred embodiment said additional ingredient is caffeine, preferably provided in an amount of between 0.001 and 0.01% by weight of said beverage, more preferably in an amount of between 0.001 and 0.007% by weight of said beverage and for instance between 0.005 and 0.007% by weight of said beverage.

In a preferred embodiment said additional ingredient is a vitamin provided in an amount of less than 1% by weight of said beverage, and for instance less than 0.8, 0.5, 0.3, 0.1% by weight of said beverage.

In another preferred embodiment said additional ingredient is a flavouring agent provided in an amount of less than 2% by weight of said beverage, and for instance less than 1.5, 1, 0.75, 0.5% by weight of said beverage.

In another preferred embodiment said additional ingredient is a coloring agent provided in an amount of less than 2% by weight of said beverage, and for instance less than 1.5, 1, 0.75, 0.5% by weight of said beverage.

In a preferred embodiment, a beverage is provided having at polyphenol content of at least 50 mg/100 ml, preferably between 75 mg/100 ml and 1 g/100 ml, and most preferably of between 80 and 120 mg/100 ml. Preferably a beverage is provided having an amount of cocoa polyphenols of more than 0.01 wt %, or of at least 0.05 wt %, and preferably between 0.05 wt % and 1.5 wt % and more preferably between 0.08 wt % and 0.2 wt %.

According to yet another preferred embodiment, a beverage is provided having a pH of less than 5, preferably less than 4, and most preferably having a pH of between 3.0 and 3.5.

In a still another preferred embodiment, a beverage or drink is provided having an ORAC value of at least 1000 μmol TE per 100 ml, preferably at least 2000 μmol TE per 100 ml, more preferably of between 2500 and 3500 μmol TE per 100 ml.

Some of the preferred cocoa-derived materials (syrup/powder compositions) and beverages are low calorie products, and thus sugar substitutes and sweeteners are preferred, especially in producing products with a per serving calorie count of less than or about 100 calories, or less than or about 70 calories, or less than or about 60 calories, or less than or about 50 calories, or less than or about 40 calories, or less than or about 30 calories, or substantially zero calories.

Preservatives and similar functional compounds and stabilizing agents, emulsifiers or beverage stabilizers, can also be used in the cocoa-derived materials and beverages as defined herein.

It will be understand that many other ranges or specific beverages can be selected and used. The beverages according to the present invention have an improved taste. Furthermore, a cocoa product contained in said beverages will not sediment.

A cocoa-derived beverage as defined above is preferably obtained or obtainable by a method comprising the steps of
 a. Providing a cocoa-derived material as defined herein, b. admixing water, preferably carbonated water, to said cocoa-derived material under aseptic conditions while optionally also adding other ingredients such as sugar and/or $CO_2$, and c. Optionally filling the mixture of step b) in suitable recipients.

The below given examples are meant to illustrate the invention. Examples 9 and 10 provide specific cocoa-derived syrups and beverages prepared there with according to the invention. Example 11 provides a specific cocoa-derived powder composition and beverages prepared there with according to the invention. Examples 12 to 14 provide an overview of components present in syrups, powder compositions and beverages according to the invention. Example 15 and 16 relate to a taste panel experiment. Example 17 illustrates an embodiment of a soluble cocoa powder and of a cocoa extract which may be used in the present cocoa-derived material.

C) Cocoa Ice Cream

C1) Ice Cream

In another aspect, the present invention is directed to an ice cream comprising a cocoa derived material and in particular comprising a soluble cocoa powder, wherein the cocoa powder has a high solubility in water at low temperature.

In particular, the invention relates to an ice cream comprising up to 15 wt %, and preferably between 2 and 10 wt %, and for instance 2, 3, 4, 5, 6, 7, 8, 9, 10, 11, 12, 13, 14, 15 wt % of a soluble cocoa powder, wherein said cocoa powder has a solubility in water of at least 50% at a temperature of less than 10° C.

The term "soluble" or "high solubility" in this context refers to a cocoa powder that can be at least partly dissolved in a suitable liquid, e.g. in a polar, water-based or aqueous solvent such as milk, water, an alcohol or a mixture thereof. For definitions of solubility and how to measure this feature, reference is made to the description given above.

Solubility of a cocoa powder used in an ice cream according to the invention can be measured by agitating or shaking at a temperature of less than 10° C., preferably less than 5° C., and for instance less than 9, 8, 7, 6, 5, 4, 3, 2, 1° C. and a pressure of 1 atmosphere (atm) an amount of 10 grams of solute, herein the cocoa powder, with an amount of 90 g of solvent of choice for at least 2 hours, when avoiding evaporation by using a closed system. Then the solution is filtered over a Whatmann filter with a pore size between 5 and 12 micrometers. The filtrate is dried in an oven overnight at 105° C., and the amount of dry matter is determined. Solubility is calculated based on the amount of dry matter remaining after filtration compared to the amount of solute put into practice. Another technique includes the centrifugation of the above solution with a centrifuge at 10000 rpm for 5 minutes. After centrifugation, the upper 'soluble' layer is used to measure the dry matter content according to the procedure as described above.

In a preferred embodiment, a soluble cocoa powder applied in the present ice cream has a degree of solubility in a solvent, preferably in a polar solvent, preferably a water-based or aqueous solvent, and for instance in water or milk, and at a temperature of less than 10° C., preferably less than 5° C., and for instance less than 9, 8, 7, 6, 5, 4, 3, 2, 1° C. of at least 50%, and more preferably of at least 70%, and even more preferably of at least 90% and most preferably of between 95 and 100% or even of between 98 and 100%. Preferably, said soluble cocoa powder has a solubility in a water-based solvent, and for instance in water or milk, and at a temperature of less than 10° C., preferably less than 5° C., and for instance less than 9, 8, 7, 6, 5, 4, 3, 2, 1° C. which is comprised between 50 and 100% and preferably a solubility of at least 50, 60, 65, 70, 75, 80, 85, 90, 95, 96, 97, 98, 99, 99.5 or of 100%. The present invention provides a soluble cocoa powder wherein the amount of insoluble material in a water-based solvent, and for instance in water or milk, and at a temperature of less than 10° C., preferably less than 5° C., and for instance less than 9, 8, 7, 6, 5, 4, 3, 2, 1° C. is lower than 50 wt %, and preferably lower than 40, 35, 30, 25, 20, 15, 10, 5, 4, 3, 2, 1, or 0.5 wt %.

In one embodiment, an ice cream is provided comprising a suitable amount of soluble cocoa powder as defined herein, wherein said cocoa powder has a solubility in water at a temperature of 10° C. of at least 90% and most preferably of between 95 and 100%.

In another embodiment, an ice cream is provided comprising a suitable amount of soluble cocoa powder as defined herein, wherein said cocoa powder has a solubility in water at a temperature of 5° C. of at least 90% and most preferably of between 95 and 100%.

For comparison, "conventional cocoa powder" available in the art consist of a cocoa powder which typically has a solubility lower than 20% and for instance of between 10 and 15% in a water-based solvent, for instance in water or milk, having a temperature of less than 10° C., or less than 5° C.

An ice cream according to the present invention is in particular characterized by an improved spoonability. The term "spoonability" as used in the present application is intended to refer to the ability of an ice cream to be scooped out with a spoon at deep freeze temperature of for instance −20° C. Spoonability of an ice cream can be determined based on its hardness. Therefore, the features of "spoonability" and "hardness" of an ice cream are closely related and in some embodiments of the present invention the terms "spoonability" and "hardness" of an ice cream are used interchangeably.

"Hardness" of an ice cream is measured as the resistance of the ice cream to deformation when an external force is applied. The hardness of ice cream can be measured by comparing the force, needed for a certain object to penetrate the ice cream, with the depth of penetration that was measured.

Ice cream hardness can be measured in various ways. In a first method a penetrometer can be used and such method comprises the penetration of a standard cone into an ice cream sample for a certain period of time, e.g. 15 seconds. A log C value can be calculated from the penetration depth according to formulas known to a person skilled in the art.

In a second method conventional textural analyzers can be used, and such method comprises the introduction of a probe into ice cream for a certain depth, e.g. 1 cm depth. Probes may include for instance cylindrical probes having a flat bottom surface. The force necessary to penetrate to this depth is then measured and is an indication for the hardness of such ice cream. This force can be measured in N (Newton) or kgf (kilogram force). Conversion of kgf or Newton values to log C values can be calculated according to formulas known to a person skilled in the art. The Applicant has found that an ice cream according to the invention and comprising a soluble cocoa powder as defined herein that is highly soluble at relatively low temperatures, has a lower hardness after a certain time at −20° C., e.g. after 24 or 48 hours at −20° C., compared to ice cream comprising a same amount of a conventional cocoa powder, i.e. cocoa powder typically having low solubility in a cold liquid, i.e. between 10 and 15% in a liquid of less than 10° C., preferably less than 5° C. This is further illustrated in example 2 given below.

In addition, in another preferred embodiment of the invention an ice cream is provided having a hardness after at least 24 hours at −20° C. which is, at a penetration depth of 10 mm or more, at least 1.5, 2, 2.5, or 3 times lower compared to that of a control ice cream. The invention provides an ice cream having been kept at −20° C. for at least 24 hours, wherein the force necessary to introduce a probe or cone of a texture analyzer, for instance a cylindrical probe having a flat bottom surface, is at a penetration dept of 10 mm or more at least 1.5, 2, 2.5 or even 3 times lower compared to the force required for a control ice cream to be penetrated with such probe or cone. In other words, an ice cream that contains a soluble cocoa according to the invention is much softer and thus has improved spoonability than control ice cream comprising a conventional cocoa powder. It shall be noted that "control ice cream" in the present context is intended to refer to an ice cream which differs from an ice cream according to the invention in the solubility under the indicated conditions of the cocoa powder applied in the ice cream.

In another preferred embodiment of the invention an ice cream is provided having after 48 hours at −20° C. a hardness as measured with a texture analyzer as a force of less than 30 N (or 3 kgf), preferably less than 28N, and for instance less than 25, 24, 23, 22, 21, 20, 19, 18, 17, 16, 15, 14, 13, 12, 11, 10N, for penetrating a probe, preferably a cylindrical probe having a flat bottom surface, and more preferably a metal cylindrical probe having a flat round bottom surface with a diameter of 0.25 inch (6.35 mm), in said ice cream at a penetration depth of at least 5 mm, preferably at least 10 mm, and for instance at a penetration depth of 5, 6, 7, 8, 9, 10, 11, 12, 13, 14, 15, 16, 17, 18 mm. At a penetration depth of at least 5 mm, preferably at least 10 mm, and for instance of 5, 6, 7, 8, 9, 10, 11, 12, 13, 14, 15, 16, 17, 18 mm, at least 1.5, 2, or 3 times less force is needed to penetrate a probe of a texture analyzer, preferably a cylindrical probe having a flat bottom surface, and more preferably a metal cylindrical probe having a flat round bottom surface with a diameter of 6.35 mm, in the present ice cream compared with a control ice cream. In a particularly preferred embodiment the invention provides an ice cream having after 48 hours at −20° C. a hardness as measured with a texture analyzer as a force of less than 30N for penetrating a cylindrical probe with flat bottom surface, and preferably a diameter of 0.25 inch (6.35 mm), in said ice cream at a penetration depth of at least 10 mm.

In yet another embodiment of the invention an ice-cream is provided that has after 48 hours at −20° C. a hardness as measured with a texture analyzer as a force of less than 30 N for penetrating a cylindrical probe, preferably a probe with a diameter of 0.25 inch (6.35 mm), with flat bottom surface in said ice cream at a penetration depth of 10 mm. In other words, the invention provides an ice-cream that has after storage for 48 hours at −20° C. a hardness, which is measured with a texture analyzer and which corresponds to a force of less than 30 N for penetrating a cylindrical probe, preferably a probe with a diameter of 0.25 inch (6.35 mm), with flat bottom surface in said ice cream at a penetration depth of 10 mm.

In another embodiment of the invention an ice-cream is provided that has after 24 hours at −20° C. a hardness as measured with a texture analyzer as a force of less than 25N for penetrating a cylindrical probe, preferably a probe with a diameter of 0.25 inch (6.35 mm), with flat bottom surface in said ice cream at a penetration depth of 10 mm. In other words, the invention provides an ice-cream that has after storage for 24 hours at −20° C. a hardness, which is measured with a texture analyzer and which corresponds to a force of less than 25N for penetrating a cylindrical probe, preferably a probe with a diameter of 0.25 inch (6.35 mm), with flat bottom surface in said ice cream at a penetration depth of 10 mm.

Typically ice cream contains a considerable quantity of air, frequently up to half of its volume. This gives the product its characteristic lightness and creaminess. The air content of ice cream is named its overrun. Overrun is expressed in percentage by volume and defined as the percentage by which the volume of an ice cream mixture as defined herein is increased with air during freezing.

An aerated finished ice cream may have an overrun of for example 90 to 100%. Typically additives such as stabilizers, in particular such as Locust Bean Gum, Guar Gum, Carboxymethyl cellulose (CMC), Xanthan gum, Sodium alginate, Carrageenan, or Gelatin must be added during preparation to obtain ice creams having the indicated value of for example 90 to 100% overrun. In accordance with the present invention, an ice cream according to the present invention can achieve such overrun value, for example of about 90 to 100%, but addition of less additives such as stabilizers is required compared to control ice creams to arrive at such overrun values. Thus, in accordance with the present invention, by using soluble cocoa, less additives such as stabilizers as disclosed herein need to be used to achieve an overrun as provided above.

In particular, the invention provides an ice cream having an overrun of for example about 90 to 100% and wherein the amount of additives such as stabilizers as disclosed herein, which are typically added during the production process for arriving at this overrun, are lower, and for instance at least 1, 2, 3, 4, 5, 6, 7, 8, 9, 10% lower than the amounts added for control ice cream. Thus, an ice cream is provided wherein the amount of additives such as stabilizers as disclosed herein added to an ice cream mixture as defined herein to arrive at an overrun of between 90 and 100% is at least 1, 2, 3, 4, 5, 6, 7, 8, 9, 10% lower than the amounts added to control ice cream mixtures. Compared to control ice cream, wherein conventional cocoa powder is used typically having low solubility in cold water, i.e. between 10 and 15% in water of less than 10° C., preferably less than 5° C., the present invention provides an ice cream which is more aerated and lighter and which has a weight in kg per liter which is lower and preferably at least 1, 2, 3, 4, 5, 6, 7, 8, 9, 10% lower than that of control ice cream. Preferably an ice cream according to the invention has a weight in kg per liter of between 1.09 and 1.1 (kg/liter).

In a preferred embodiment of the invention, an ice cream according to the present invention comprises:
  up to 15 wt %, and preferably between 2 and 10 wt % of said soluble cocoa powder,
  up to 20 wt % and preferably between 0 and 15 wt % of milk powder,
  up to 30 wt %, and preferably between 0 and 20 wt % of sugars,
  up to 20 wt %, and preferably between 0 and 15 wt % of fat,
  optionally less than 1 wt %, and preferably less than 0.5 wt % of stabilizers, and
  optionally less than 0.5 wt %, and preferably less than 0.3 wt % of emulsifiers, and
  between 35 and 75 wt % of water or milk.

In one embodiment said ice cream comprises between 35 and 75 wt % of water and for instance between 40 and 60 wt % of water, and for instance at least 35, 40, 45, 50, 55, 60, 65, 70 wt % of water.

In another embodiment, the invention provides an ice cream as disclosed above, but wherein said water is replaced by milk, including whole, defatted or partly defatted milk. Amounts of milk added may comprises between 35 and 75 wt % and for instance between 40 and 60 wt % and for instance at least 35, 40, 45, 50, 55, 60, 65, 70 wt % of milk, depending on milk fat content. In such embodiment, the addition of a milk powder as defined herein is optional.

In one preferred embodiment, the invention provides an ice cream comprising up to 15 wt % of a soluble cocoa powder as defined herein, and preferably between 2 and 10 wt % of said soluble cocoa powder, and for instance 2, 3, 4, 5, 6, 7, 8, 9, 10 wt % of a soluble cocoa powder as defined herein.

In another preferred embodiment, the invention provides an ice cream comprising up to 20 wt % and preferably between 0 and 15 wt % of milk powder, and for instance 2, 4, 6, 8, 10, 12 wt % of a milk powder. Such milk powder may include any milk powder known in the art, and e.g. whole or defatted or partly defatted milk powder.

In one preferred embodiment, the invention provides an ice cream comprising up to 30 wt %, and preferably between 0 and 20 wt % of sugars, and for instance between 5 and 20 wt % or between 10 and 15 wt %, said sugars being preferably selected from the group comprising glucose, dextrose, sucrose and inverted sugar. The present invention has for advantage that the sugar content of the ice cream can be reduced. As implication, the ice creams of the invention comply with increased consumer needs for lower calorie products.

In another preferred embodiment, the invention provides an ice cream comprising up to 20 wt %, and preferably between 0 and 15 wt % of fat, and for instance less than 20, 18, 15, 13, 10, 8, 5 wt % of fat. The fat may be of dairy and/or non dairy origin. Said fat may for instance be selected from the group comprising dairy fat such as milk fat or butter and non dairy fat, such as vegetable fats.

Another particular aspect of the invention is the moderate use of stabilizers in said ice cream. Stabilizers may be selected from conventional products like vegetable, animal and fermented hydrocolloid stabilisers examples of which are xanthan gum, guar gum, modified guar gum, alginates, carrageenan, semi-refined carrageenan, locust bean gum, tara gum, pectin, agar, carboxymethyl cellulose, irish moss, sodium alginate or combinations thereof, e.g. Cargill's Lygomme™. Gelatine from animal and marine sources may also be chosen to be incorporated into the ice cream according to the invention. In an embodiment of the invention, said ice cream, comprises less than 1 wt %, and preferably less than 0.5 wt %, and for instance less than 0.4, 0.3, 0.2 wt % of stabilizers. Surprisingly the use of stabilizers in ice creams of the invention can be significantly reduced compared to control ice creams. This reduction has the advantage that the feel of the ice cream in the mouth is improved.

Another particular aspect of the invention is the moderate use of emulsifiers in said ice cream. In an embodiment of the invention, said ice cream, comprises less than 0.5 wt %, and preferably less than 0.3 wt % of emulsifiers, and for instance less than 0.2 or 0.1 wt % of emulsifiers. Examples of suitable emulsifiers comprise but are not limited to (fresh) egg yolk, stabilized egg yolk (SEY), enzymatically treated egg yolk, dried egg yolk, salted egg yolk, or egg yolk treated in any other way as known in the art of egg yolk emulsifiers to yield egg-yolk derived emulsifiers, e.g. lecithin. The presence of egg yolk is beneficial for taste and emulsification of the oil droplets.

Optionally, the present ice cream may further comprise one or more additional components selected from the group comprising sweeteners, vitamins, flavouring agents and colouring agents.

Available sweeteners that can be selected and added to an ice cream according to the present invention include but are not limited to Acesulfame potassium (Ace-K), sucralose, maltitol, xylitol, erythritol, mannitol, sorbitol, lactitol, isomaltulose, powdered hydrogenated glucose syrup, aspartame, neotame, cyclamate, saccharine, glycyrrhizine, dihydrochalcones, thaumatin, monellin, neohesperidine, any of the polyol compounds, any available natural products of plants, such as glycosides and specifically stevioside and rebaudioside A, other compounds available in the art and any combination of two or more of these sweeteners.

Vitamins that may be used in an ice cream according to the present invention may include but are not limited to for instance vitamin C, vitamin D, vitamin E or other compounds available in the art.

Flavouring agents that may be used in an ice cream according to the present invention include but are not limited to for instance flavor agents known or available and for instance vanillin, coumarin, and other compounds available in the art.

Coloring agents that may be used in ice cream according to the present invention include but are not limited to for instance β-carotene, annatto and preservatives such as e.g. sodium- or calciumpropionate, sulphite ammonia caramel, E150d, other compounds available in the art or any combinations thereof.

Other components that may be added to the present ice cream to enhance the appearance or taste of the final ice cream may include but are not limited to chocolate chips, fruit including dried fruit such as raisins, sultanas and apple; fresh fruits such as orange, pear and apple, freeze-dried fruit such as raspberries, or vegetable fiber, e.g. inulin, fibergum from Acacia tree, nuts such as hazelnuts, pecan nuts and almonds, chopped nuts, sliced nuts, or any mixtures thereof. The amount of components such as those indicated above in an ice cream according to the present invention is variable.

Ice cream comprising a soluble cocoa powder according to the invention has the advantage of having a substantially homogeneous flavor composition. Furthermore, the Applicant has shown a functionality of said soluble cocoa powder as defined herein on the spoonability (hardness) of ice cream. In addition, the Applicant also showed that the present ice cream provides a better mouth feel.

The soluble cocoa powder applied in the present ice cream preferably has one or more of the characteristics of the soluble cocoa powder as defined above, e.g. in section A7). A soluble cocoa powder applied in the present ice cream is preferably prepared by a method as schematically illustrated in FIG. 1. This method is explained above.

In a preferred embodiment, the invention provides a ice cream comprising between 2 and 10 wt % of a soluble cocoa powder, whish is in a dry or lyophilized form, and preferably in the form of granules, pellets, or a powder having a solubility at a temperature of 10° C. in an aqueous solvent, e.g. water, of at least 90%, and preferably of between 95 and 100%, and having:
- an amount of theobromine which is lower than 5% by fat-free dry weight, and for instance between 2.5 and 5% by fat-free dry weight, and
- an amount of caffeine which is lower than 1% by fat-free dry weight, and
- an amount of polyphenols which is comprised between 1 and 24 wt % by fat-free dry weight, and for instance between 7 and 13% by fat-free dry weight, and
- an amount of glucose, glucose oligomers and/or dextrines comprised between 10 and 60% by fat-free dry weight, and for instance between 15 and 40 wt %.

The invention provides ice creams which are rich in desirable compounds such as cocoa-based amino acids, peptides and proteins. In addition, ice creams according to the invention have excellent organoleptic and nutritive properties, and have, in view of the polyphenol content of the soluble cocoa product, the advantage of health benefits.

C2) Method for Preparing an Ice Cream

In another aspect, the present invention provides a method for preparing an ice cream according to the invention. In a first step of such method an aqueous ice cream mixture is prepared comprising the following components:

up to 15 wt %, and preferably between 2 and 10 wt % of said soluble cocoa powder,
up to 20 wt % and preferably between 0 and 15 wt % of milk powder,
up to 30 wt %, and preferably between 0 and 20 wt % of sugars,
up to 20 wt %, and preferably between 0 and 15 wt % of fat,
optionally less than 1 wt %, and preferably less than 0.5 wt % of stabilizers, and
optionally less than 0.5 wt %, and preferably less than 0.3 wt % of emulsifiers, and
between 35 and 75 wt % of water or milk.

More detail about these components is provided above.

It shall be noted that the term "ice cream mixture" as used in the present application is intended to refer to an "aqueous" mixture, i.e. a mixture which may be in a liquid form and which may contain water or milk.

In an alternative embodiment, an ice cream mixture is prepared wherein the water is replaced by milk, including whole, defatted or partly defatted milk. In such embodiment, the addition to the ice cream mixture of a milk powder as defined herein is optional.

The mixture of components is typically prepared using conventional methods such as by combining the components with shear mixing to disperse and solubilize them into a homogeneous mass. In one embodiment, components, i.e. a soluble cocoa powder, sugars, fat, are provided in dry form. The use of highly soluble cocoa powder has the advantage of requiring less heating and preparation time, resulting in an easier and faster process. In addition, it has the advantage that problems related to settling of insoluble matter and marbling are greatly reduced or even avoided.

Once all components have been blended together, the prepared ice cream mixture may be heated to a temperature of between 60 and 100° C., and for instance to a temperature of between 65 and 95° C. or to a temperature of between 80 and 85° C., for at least 1 minute, and for instance for at least 5 or 10 minutes. The mixture can for instance be heated at 80° C. for 20 minutes in order to hydrate formed hydrocolloids.

Subsequently, the mixture is pasteurized. For pasteurization, the mixture can be heated to a temperature of between 65 and 90°, and for instance between 69 and 90° C. for a time period between 30 minutes to 20 seconds to achieve satisfactory treatment to confirm public health requirements and also avoiding as much as possible any significant denaturation of proteins.

Optionally, the mixture is then subjected to a homogenization stage to reduce the dimensions of the fat droplets, by homogenizing the mixture at a pressure of 120 to 160 bar, at a temperature of 70 to 85° C.

The homogenized mixture is rapidly cooled to chill temperatures and then aged. The mixture can be aged after pasteurization by storing at a temperature of about 0° C. to about 15° C., preferably at a temperature of between 5 and 10° C., for about 1 hour to about 24 hours, and for instance by holding it for 1 to 4 hours at 4° C.

The mixture can then be frozen using an ice cream continuous freezer known as scrapped surface heat exchanger where it can be aerated by incorporating sufficient air to give a desired overrun, for example an overrun of between 90 to 100%.

As already explained above, the invention provides an ice cream mixture which achieves a suitable overrun value, for example of about 90 to 100%, requiring the addition of less additives such as stabilizers compared to control ice creams. Thus, in accordance with the present invention, by using soluble cocoa, substantially less additives such as stabilizers as disclosed herein need to be used to achieve the indicated overrun.

The ice cream can be frozen down to temperatures lower than −6° C., typically of −8 to −10° C. As the ice cream is drawn with about half of its water frozen, particulate components such as fruits, nuts, candy, cookies, chocolate chips, nuts, vegetable fiber, or whatever is liked, can be added to the semi-frozen slurry which has a consistency similar to soft-serve ice cream.

After optional particulate components have been added, the ice cream is packaged into suitable recipients, e.g. transparent plastic cups closed with transparent lids, and hardened by placing it into a blast freezer at e.g. −20° to −40° C. where most of the remainder of the water is frozen. Hardening involves static (still, quiescent) freezing of the packaged products in blast freezers. Freezing rate must still be rapid, so freezing techniques involve low temperature (−40° C.) with either enhanced convection (freezing tunnels with forced air fans) or enhanced conduction (plate freezers). Ice cream can be stored at −30° C.

If desired, the ice cream can have a coating that optionally contains particulate components which are added before or during freezing.

The process produces an ice cream which is softer, which has an increased capability of stabilizing oxygen, i.e. improved overrun, and has a smooth texture and gives a better mouthfeeling, i.e. not sandy.

C3) Food Products

The invention further provides a food product comprising an ice cream according to the invention. Said food product may be a frozen confection, dessert, a bakery product, or a sauce.

In accordance with the present invention, a novel and useful ice cream and a process for producing the same are provided. According to the present invention an ice cream which is capable of being spooned up easily by a spoon, an ice cream disher and the like even relatively rapidly after being taken out of a freezer, e.g. a household freezer, can be produced in a convenient way. An ice cream having excellent flavor can be produced. The hardness of an ice cream can be freely controlled and the present ice cream has a property of excellent meltdown in the mouth. In addition, the process for production of the present invention is characterized by being capable of producing an ice cream having a property of excellent softness in the mouth even at a freezing temperature and excellent flavors, without the excessive addition of components having an anti-freezing effect such as salt, alcohol and the like to an ice cream mixture.

EXAMPLES

The invention is illustrated with the following non-limiting examples.

Example 1

Solubilisation of Cocoa Powder Using Only Enzymatic Treatment (Prior Art)

Standard cocoa powder is treated enzymatically for three days. 10 kg of medium alkalized cocoa powder (commonly used in the industry) is suspended in 40 kg of water in a batch reactor with stirring. The temperature is increased to 80° C., the pH is set to 5.8 with HCl and 10 g of termamyl classic (Novozymes) is added. The amylase enzyme treats the cocoa powder for 2 hours under continuous mild stirring. Then, the temperature is lowered to 45° C. and 10 g of Gammazym (endo-protease, AB enzymes) is added. After again 2 hours of reacting while stirring, the temperature is raised again to 67.5° C., the pH to 7.0 with NaOH. 10 g of Corolase (exopeptidase, AB enzymes) is added and treated the cocoa for another 2 hours. Then, the temperature is set at 60° C. and pH 5.5. 10 g of celluclast, 10 g of fungamyl and 10 g of ultraflo (all Novozymes) are added. 18 hours later pectines and viscozyme (both Novozymes) are added after lowering the temperature to 37° C. and the pH to 5 with HCl. After another 2 hours, the suspension is heated up to 80° C. for 2 hours. After stirring the suspension at high speed for homogenizing, a sample is taken of about 100 ml.

A measured amount is dried in an oven at 105° C. overnight to analyze the dry matter content. Another weighed amount of this sample is filtered over a Whatmann filter with a pore size between 5 and 12 micrometers. The filtrate is also dried in an oven overnight at 105° C. These analyses are repeated 3 times. The results clearly indicate that 45% of the cocoa powder passes through the filter, indicating a 55% insoluble cocoa material that is not solubilised by the enzymes. In these analyses it is taken into account that a few soluble enzymes and NaOH and HCl are added to the suspension.

For a composition of a cocoa product obtained in the present example, reference is made to example 7.

Example 2

Solubilisation of Cocoa Powder

Effect of Contact Time

Different cocoa suspensions (20% solution) were prepared. The suspensions were brought to a pH of 12 and maintained at 120° C. and the applied (ambient) pressure was increased with 1 bar extra pressure for 0, 30, 60, 120, 180 minutes. After this treatment, the pH was lowered to 5.5 and the suspensions were treated at 55° C. and for 2 hours with cellulase and pectinase (both applied at 0.1% w/w, Novozymes). Subsequently the suspension was treated for one hour with an amylase and for two hours with a protease, at optimal temperatures (termamyl from Novozymes at 80° C. and Neutrase from Novozymes at 45° C.). Solubilisation was measured by looking at the dry weight content of the filtrate after filtration.

Visually, there was an immediate result. The prepared samples produced a great amount of foam after filtration, indicating that proteins had been liberated by the treatment and were present in the filtrate. The longer the applied contact time, the more foam was produced. Foam was not produced in the sample that had not been treated at a high pressure, but that had been maintained at a pH of 12.

Table A provides an overview of the solubilisation (i.e. the percentage of solubilised starting material, in function of the applied contact time.

TABLE A

| contact time (minutes) | Solubilisation (yield: %) |
|---|---|
| 0 | 45 |
| 30 | 51.4 |
| 60 | 53.4 |

TABLE A-continued

| contact time (minutes) | Solubilisation (yield: %) |
|---|---|
| 120 | 58.5 |
| 180 | 62.6 |

Application of an elevated pH (12) has a small impact on the solubilisation of the cocoa powder. Application of an enzymatic treatment without pH treatment permits to provide a yield of 45% (see also example 1). However, in combination with an increased temperature and a pressure treatment, an important increase of the solubilisation after the enzymatic treatment can be obtained.

Example 3

Solubilisation of Cocoa Powder

Effect of the pH

Four cocoa suspensions (10% w/w) were prepared. The suspensions were brought to a pH of 9, 10, 11 or 12 and maintained at 120° C. and 1 extra bar pressure for 180 minutes. After this treatment, the pH was lowered to 5.5 and the suspensions were treated at 65° C. and for 3 hours with cellulase (celluclast from Novozymes applied at 0.1% w/w). Table B provides an overview of the solubilisation in function of the applied pH.

TABLE B

| pH | solubilisation (%) |
|---|---|
| 9 | 29.8 |
| 10 | 38.5 |
| 11 | 43.9 |
| 12 | 65.8 |

These results indicate that even without the application of proteases, a solubilisation of 65% can be achieved; indicating that cocoa proteins are (at least partly) water-soluble or that the proteins are not affected by proteases. The pH is an important factor for making cocoa powder more water-soluble.

Example 4

Solubilisation of Cocoa Powder—Effect on Protein Content of the Obtained Soluble Cocoa Product A cocoa suspension (10% w/w) was prepared. The suspension was brought to a pH of 12 and maintained at 120° C. and 1 extra bar pressure for 180 minutes. After this treatment, the pH was lowered to 5.5 and the suspension was divided in two samples. One sample was first treated with a protease and then with a cellulase, the other sample was first treated with a cellulase and then with a protease. Treatment with the cellulase was done at a temperature of 60° C. for 3 hours using 0.1% w/w on the cocoa powder of cellulase(celluclast, Novozymes). Treatment with the protease was done at a temperature of 50° C. for 3 hours using an amount of protease of 0.1% w/w (gammazym, AB enzymes).

Results of this experiment indicated that a pH pressure treatment in accordance with the present invention increased solubilisation of the cocoa powder when applying a sequential enzymatic treatment of cellulase first, followed by protease. An enzymatic treatment comprising first using a protease followed by using a cellulase, did not increase solubilisation of the cocoa powder.

These results indicate that the sequence of applying enzymes in the enzymatic treatment is of importance in the present method.

Example 5

Solubilisation of Cocoa Powder Using a Method According to the Invention

A 20% w/w suspension of cocoa powder in mineral water is prepared by homogenisation at room temperature.

The suspension is treated with alpha-amylase (0.1% w/w dry solids termamyl, Novozymes) at 85 deg C. for 2 hours, while stirring the suspension. After this enzyme step, a sample reveals that the cocoa powder contains between 30 and 40% soluble components.

The suspension is filtered and the insoluble material together with the filter membrane placed in a freezer at −25 deg C. for about an hour. Then, the filter, together with the frozen insoluble material, is immersed in double distilled water ($ddH_2O$) at a temperature of 99° C. to create a heat shock-effect. The insoluble material is gently removed from the filter with water, to create a suspension.

This suspension is filtered again, to measure the amount of soluble material in the filtrate. Solubilisation increases to between 40 and 50%.

The residue, that is obtained after amylase treatment and heat-treatment, was re-dissolved and was further treated at a pH of 12 for 3 hours at 120° C. and 1 extra bar pressure. Subsequently the pH of the treated suspension was lowered to a pH of 11.5 to 10.5. Subsequent enzymatic treatment comprised application of enzymes such as cellulase (celluclast Novozymes), proteases (gammazym AB enzymes) in a sequential mode, as described above. A soluble cocoa product was obtained showing 95.5% solubility.

Example 6

Solubilisation of Cocoa Powder Using Enzymatic Treatment Combined With Freezing and Shock Heat Treatment A 20% w/w suspension of cocoa powder in mineral water is prepared by homogenisation at room temperature.

The suspension is treated with alpha-amylase (0.1% w/w dry solids) at 85 deg C. for 2 hours, while stirring the suspension. After this enzyme step, a sample reveals that the cocoa powder contains between 30 and 40% soluble components.

The suspension is filtered and the insoluble material together with the filter membrane placed in a freezer at −25 deg C. for about an hour. Then, the filter, together with the frozen insoluble material, is immersed in double distilled water ($ddH_2O$) at a temperature of 99° C. to create a heat shock-effect. The insoluble material is gently removed from the filter with water, to create a suspension.

This suspension is filtered again, to measure the amount of soluble material in the filtrate. Solubilisation increases to between 40 and 50%.

The insoluble material on the filter is then re-suspended in mineral water, and treated with cellulase (celluclast Novozymes) at the optimal temperature and pH. In this case; 65° C. and pH 5.2. Filtering and drying the suspension shows that solubilisation rises by 10 to 20% as shown by evaporating the filtrate to a dry mass. The remaining insoluble material on the filter is resuspended and treated again enzymatically, by using glucanase, pentosonase, carbohydrase, hemicellulase, xylanase and pectinase. All of the enzymes are used separately (0.1% w/w dry solids) at the optimal temperature and pH. After filtering and drying again, the yield achieved is between 70 and 80%.

Example 7

Soluble Cocoa Product

Tables C provides an example of a composition and characteristics of
- an cocoa powder used as starting material in a method according to the present invention. The illustrated powder has a solubility of 20%.
- an example of a soluble cocoa product obtained with a prior art method. This soluble cocoa product is obtained as a result of a 45% solubilisation of a standard cocoa powder when carrying out a prior art method (see example 1). The resulting cocoa product is completely soluble in water or milk (solubility=100%).
- an example of a soluble cocoa product obtained when carrying out a method according to a first aspect of the present invention. This soluble cocoa product is obtained as a result of a 100% solubilisation of a standard cocoa powder, i.e. when carrying out a method according to a first aspect of the present invention with a yield of 100%. The resulting cocoa product is completely soluble in water or milk (solubility=100%).

The amount of fat is expressed in wt %.

Amounts of other components are expressed in % by fat-free dry weight, i.e. by weight on a dry fat-free basis.

TABLE C

| Starting product cocoa powder | End product cocoa powder 45% yield (prior art - see example 1) | End product cocoa powder 100% yield |
|---|---|---|
| 10-12 w % fat | 0-27 w % fat | 0-12 w % fat |
| 28 wt % proteins | 12 wt % proteins | 28 wt % amino acids, peptides, proteins |
| 6 wt % ash | 11 wt % ash | 6 wt % ash |
| 2.5 wt % sugars | 5 wt % sugars | 2.5 wt % sugars |
| 14.5 wt % starch | 31 wt % glucose and dextrines (when amylase applied in the method) | 14.5 wt % glucose and dextrines |
| 3.5 wt % pentosanes | 7-8 wt % pentosanes | 3.5 wt % pentosanes |
| 22.5 wt % cellulose | Cellulose is discarded with the insoluble fraction and not degraded into glucose or | 22.5 wt % glucose/glucose oligomers |

TABLE C-continued

| Starting product cocoa powder | End product cocoa powder 45% yield (prior art - see example 1) | End product cocoa powder 100% yield |
|---|---|---|
| | glucose oligomers | |
| 0.5-2 wt % pectines | 1 wt % pectines | 0.5-2 wt % pectines |
| 7-13 wt % polyphenols | 10 wt % polyphenols | 7-13 wt % polyphenols |
| 3-4 wt % organic acid | 6 wt % organic acid | 3-4 wt % organic acid |
| 3 wt % theobromine | 6-7 wt % theobromine | 3 wt % theobromine |
| 0.4 wt % caffeine | 0.8-0.9 wt % caffeine | 0.4 wt % caffeine |
| 0.8 wt % fosfatides | 1.5-1.6 wt % fosfatides | 0.8 wt % fosfatides |

Example 8

Beverage Containing a Soluble Cocoa Product or Pre-Concentrate According to the Invention Hereunder a number of beverages and compositions thereof containing a soluble cocoa product according to the present invention are illustrated.

Product 1 is a carbonated drink (cocoa cola). This drink is prepared by mixing:
⅓ of a syrup (pre-concentrate) comprising 9 wt % of a soluble cocoa product according to the invention, 21 wt % glucose, 40% sugar, 30% water and 0.1 wt % vanillin, and
⅔ of carbonated water.

Product 2 is an a carbonated drink which is prepared by making a solution comprising 9 wt % of a soluble cocoa product according to the invention, 21 wt % glucose, 40% sugar, 30% water and 0.1 wt % vanillin, and adding a suitable amount of $CO_2$ to this mixture.

Product 3 is a reconstituted cocoa drink comprising a freeze-dried mixture of soluble cocoa product according to the invention, a sweetener (e.g. sucralose) and milk. A drink is prepared by dissolving said freeze-dried mixture in hot or cold water. The resulting drink contains for instance 2% (w/v) soluble cocoa product and sweetness compared to 9% sugar.

Product 4 is a reconstituted cocoa drink comprising a freeze-dried mixture of soluble cocoa product according to the invention and a sweetener (e.g. sucralose). A drink is prepared by dissolving said freeze-dried pre-concentrate in hot or cold milk. The resulting drink contains for instance 2% (w/v) soluble cocoa product and sweetness compared to 9% sugar.

Example 9

Syrup and Beverage

Table D illustrates a syrup containing a soluble cocoa powder and a cocoa extract with elevated polyphenols level according to the present invention. The pH of this syrup is 3.3 by adding phosphoric acid.

A beverage, named cocoa cola, is produced using this syrup by mixing: 85 wt % of carbonated water and 15 wt % of said syrup. The beverage is prepared by the following process steps:
Dry mixture of ingredients of the syrup solubilised in water and pH brought on 3.3
Homogenization at 125 bar, pasteurization at 85° C. during minutes via heat exchanger or in the tank itself, direct cooling to 20° C. and aseptic filling in containers or in bag in box system.
Aseptic connection of the containers on the carbonated water installation to make cocoa cola.

TABLE D

| components | Syrup (% by weight of the syrup) | Beverage (% by weight of the beverage) |
|---|---|---|
| Defatted soluble cocoa powder | 1.33 | 0.2 |
| cocoa polyphenol extract | 1.33 | 0.2 |
| E150d (caramel) | 1 | 0.15 |
| Added caffeine | 0.04 | 0.006 |
| water | 29.63 | 89.444 |
| Added Sugar | 66.67 | 10 |

The obtained beverage (see table D) is stable and has a good taste. The beverage obtained has high antioxidant effect. A darker more transparent color is obtained for the present beverage compared to a beverage without soluble cocoa powder or without cocoa extract.

It shall be noted that beverages based on soluble cocoa powder or cocoa extract have a worse taste. When the beverage is prepared without the cocoa extract the beverage does not have a cocoa taste and flavour agents should be added in a great amount to provide a beverage with a suitable cocoa taste. On the other hand, a beverage with the cocoa extract but without the soluble cocoa powder has a very bad taste that is not suited for a beverage. There is also no cocoa flavour in this beverage.

The combination of a cocoa extract and a soluble cocoa provides the beverage with a surprisingly good taste with a good cocoa flavour that is suitable for a beverage. The beverage has a polyphenol content of about 100 mg/100 ml. Furthermore, the ORAC value of the present beverage comprising a cocoa extract and a soluble cocoa is 2260 μmolTE/100 ml. This value is higher than the ORAC values of beverages, that were prepared in accordance with the method described above but that do not contain a soluble cocoa powder or that do not contain a cocoa extract. The ORAC values for such beverages are 260 μmol TE/100 ml and 2000 μmol TE/100 ml, respectively.

Example 10

Syrup and Beverage

Table E illustrates a syrup containing a soluble cocoa powder and a cocoa extract with elevated polyphenols level according to the present invention.

A beverage is produced using this syrup by mixing: 85 wt % of carbonated water and 15 wt % of said syrup. The beverage is prepared using the method described in example 1. The obtained beverage (see table E) is stable and has a good taste.

TABLE E

| components | Syrup (% by weight of the syrup) | Beverage (% by weight of the beverage) |
| --- | --- | --- |
| Defatted soluble cocoa powder | 1.33 | 0.2 |
| cocoa polyphenol extract | 1.33 | 0.2 |
| E150d (caramel) | 1 | 0.15 |
| water | 29.67 | 89.45 |
| Added Sugar | 66.67 | 10 |

Example 11

Powder Composition and Beverage

The following example illustrates a powder composition containing a soluble cocoa powder and a cocoa extract with elevated polyphenol level according to the present invention. Components of the powder composition are illustrated in Table F. A beverage is produced using this powder by mixing 89.45 wt % of carbonated water and 10.55 wt % of said powder composition.

TABLE F

| Components | powder composition (% by weight of the powder composition) | Beverage (% by weight of the beverage) |
| --- | --- | --- |
| soluble cocoa powder | 1.9 | 0.2 |
| cocoa polyphenol extract | 1.9 | 0.2 |
| E150d (caramel) | 1.4 | 0.15 |
| water | — | 89.45 |
| Added Sugar | 94.8 | 10 |

Example 12

Syrup and Beverage with Sweetener

Table G represents components of a syrup and of a beverage prepared with such syrup. 0.8 wt % of syrup was added to 99.2 wt % of carbonated water and resulted in a good tasting drink.

TABLE G

| Components | Syrup (% by weight of the syrup) | Beverage (% by weight of the beverage) |
| --- | --- | --- |
| Defatted soluble cocoa powder | 24.64 | 0.2 |
| cocoa polyphenol extract | 24.64 | 0.2 |
| E150d (caramel) | 18.5 | 0.15 |
| Added caffeine | 0.74 | 0.006 |
| Water | 29.48 | 89.444 |
| Added Sucralose | 2 | 10 |

Example 13

Syrup and Beverage

Table H represents components of a syrup and of a beverage prepared with such syrup. 15 wt % of syrup was added to 85 wt % of carbonated water and resulted in a good tasting drink. The powder composition applied in this example corresponds to the powder composition as described in example 11.

TABLE H

| Components (total amounts) | Syrup (wt % by weight of the syrup) (based on example 1) | Beverage (wt % by weight of the beverage) (based on example 1) |
| --- | --- | --- |
| water | 29.63% | 89.444% |
| flavoring agent | — | — |
| coloring agent | 1% E150d | 0.15% E150d |
| vitamins | — | — |
| % sugar | 66.8-67.2% | 10-11% |
| % caffeine | 0.05-0.066% | 0.0075-0.01% |
| % polyphenols | 0.5-0.65% | 0.075-0.1% |
| % fats | 0.04% | 0.006% |
| % theobromine | 0.16-0.19% | 0.026% |
| % xanthines | 0.165-0.2% | 0.03% |
| % pectin | 0.02-0.08% | 0.003-0.012% |
| % ash | 0.2-1% | 0.03-0.15% |
| % fibers | 0.02-0.1 | 0.003-0.015% |
| % proteins | 0.22-0.3% | 0.03-0.045% |
| % catechin | 0.007-0.1% | 0.001-0.015% |
| % epicatechin | 0.07-0.2% | 0.01-0.03% |

Example 14

Powder Composition and Beverage

Table I represents the composition of a powder composition and of a beverage prepared with such powder composition. 10.56 wt % of the powder composition was added to 89.44 wt % of carbonated water resulting in a good tasting drink.

TABLE I

| Components (total amounts) | powder composition (% by weight of the powder composition) | Beverage (% by weight of the beverage) |
| --- | --- | --- |
| water | — | 89.44% |
| flavoring agent | — | — |
| coloring agent (E150d) | 1.4% | 0.15% |
| vitamins | — | — |
| % sugar | 95.2% | 10-11% |
| % caffeine | 0.085% | 0.0075-0.01% |
| % polyphenols | 0.78% | 0.075-0.1% |
| % fats | 0.057% | 0.006% |
| % theobromine | 0.26% | 0.026% |
| % xanthines | 0.28% | 0.03% |
| % pectin | 0.09% | 0.003-0.012% |
| % ash | 0.3-1.5% | 0.03-0.15% |
| % fibers | 0.1% | 0.003-0.015% |
| % proteins | 0.3-0.45% | 0.03-0.045% |
| % catechin | 0.014-0.14% | 0.001-0.015% |
| % epicatechin | 0.1-0.3% | 0.01-0.03% |

Example 15

Evaluation of the Beverage Taste

The taste and organoleptic properties of three beverages was evaluated by a trained taste panel.

Beverage A was prepared by mixing 15 wt % of a syrup as defined herein comprising a soluble cocoa powder and a cocoa polyphenol extract with 85 wt % carbonated water is accordance with the present invention.

Beverage B was prepared by mixing 85 wt % carbonated water with 15 wt % of a syrup comprising a soluble cocoa powder as defined herein but not containing a cocoa polyphenol extract as defined herein.

Beverage C was prepared by mixing 85 wt % carbonated water with 15 wt % of a syrup comprising a cocoa polyphenol extract as defined herein but not containing a soluble cocoa powder as defined herein.

The composition of the syrups used to prepare beverages A, B, and C is given in table J. All ingredients (syrup+carbonated water) were mixed and cooked (at 100° C.) during 1 minute. After this, the mixture was cooled during 10 minutes and kept in a fridge (12° C.) during at least one week until use.

TABLE J

|  | Syrup used for preparing Beverage A (in wt %) | Syrup used for preparing Beverage B (in wt %) | Syrup used for preparing Beverage C (in wt %) |
| --- | --- | --- | --- |
| Defatted soluble cocoa powder | 1.33 | 1.33 | — |
| cocoa polyphenol extract | 1.33 | — | 1.33 |
| E150d (caramel) coloring agent | 1 | 1 | 1 |
| caffeine | 0.04 | 0.04 | 0.04 |
| water | 39.7 | 39.7 | 39.7 |
| Added Sugar | 56.6 | 57.93 | 57.93 |

In general, when performing taste panel experiments different scores can be given to different flavors and aromas such as roasted, sweet, bitter, acidity, alkaline, chocolate, roasted, aromatic, wine, liquorices, earthy, smoke, green, believed wood, crumb, caramel, fruity, floral, biscuit, baked, bready, popcorn, cereal, malty, astringent or praline. Also a score can be given for some quality issues such as the intensity, quality, fullness, sparkling perception, astringency of the beverages and the flavors and aromas of the beverages.

In the present example, a taste panel was asked to evaluate samples of the above three beverages by presenting their comments and remarks on the aroma and flavor character of the samples. The average scores ranged from score 1 corresponding to a very bad appreciation of the beverage to score 5 which corresponds to a very good appreciation of the beverage.

The taste panel, asked to evaluate the taste and organoleptic properties of the above three beverages unanimously give the following scores to respectively beverages A, B and C: scores of 5, 2, and 1. These results clearly indicate that a beverage (beverage A) in accordance with the present invention has a much better aroma and flavor compared to beverages that are prepared without cocoa soluble powder (beverage C) or without cocoa extract (beverage B).

Example 16

Evaluation of the Beverages

In the following example, physical and taste properties of different kind of beverages were compared. The beverages were prepared by mixing 15 wt % of a syrup as defined in table K with 85 wt % carbonated water in accordance with the present invention.

TABLE K

|  | Beverage D (syrup composition in g) | Beverage E (syrup composition in g) | Beverage F (syrup composition in g) |
| --- | --- | --- | --- |
| Defatted soluble cocoa powder (solubility of more than 70% in water at 20° C.) | — | — | 2.66 |
| Standard cocoa powder (solubility lower than 70% in water at 20° C.) | 2.66 | 2.66 | — |
| cocoa polyphenol extract as defined herein | — | 2.66 | 2.66 |
| E150d (caramel) coloring agent | 2 | 2 | 2 |
| water | 59.34 | 59.34 | 59.34 |
| Added Sugar | 136 | 133.34 | 133.34 |
| TOTAL amount syrup | 200 g | 200 g | 200 g |
| Solubility of the syrup in the carbonated water | − | − | ++ |
| Sedimentation after 1 week | Yes | yes | no |
| Taste | −− | − | ++ |

'−−' = very bad;
'−' bad '+' = good;
'++' = very good

When preparing the above beverages, it was observed that the syrup used to prepare the beverage F dissolved better and more rapidly in the added carbonated water compared to the syrups used to prepare beverages D and E.

It could also be observed that in beverages D and E sedimentation was observed after one week, while in beverage F no sedimentation could be observed even after storage of the drink for one week. Beverage F had a much better taste and mouth feel than drinks D and E.

In addition, beverage F had a much better taste, aroma and flavor compared to:
(I) a beverage that was prepared with the same ingredients as for beverage F but not containing a cocoa soluble powder. The amount of cocoa soluble powder was replaced by additional sugar; and
(II) a beverage that was prepared with the same ingredients as for beverage F but not containing a cocoa extract. The amount of cocoa extract was replaced by additional sugar.

Unexpectedly, even when more sugar was added to these comparative drinks (I and II), the taste of these drinks remained unsatisfactory compared to the taste of beverage F. The three drinks were tested by a taste panel and this panel indicated that the taste of beverage F was the best; this drink had a beautiful, full and rich taste. Whereas, even if the taste of drink I resembled the taste of beverage F, the taste of this drink was however very fade and not satisfactory. The taste of drink II did not reassemble the taste of beverage F and was not acceptable.

Use of a mixture of soluble cocoa powder and a cocoa extract as defined herein to prepare a beverage thus provides beneficial and unexpected effects over the separate use of these individual components: by using these components in combination a drink with an exceptional good taste was obtained that did not show sedimentation problems and had a good shelf life.

Example 17

Embodiments of a Soluble Cocoa Powder and a Cocoa Extract Suitable For Use in the Present Invention Table L illustrates an embodiment of the composition of a soluble cocoa powder that can be used in a cocoa-derived composition according to the invention. In this table the amount of fat is expressed in wt %. Amounts of other components are expressed in % by fat-free dry weight, i.e. by weight on a dry fat-free basis. This example of soluble cocoa powder has more than 90% solubility in water at 20° C.

TABLE L

| Ingredient | Amount |
| --- | --- |
| fat | 0-12 w % |
| amino acids, peptides, proteins | 28 wt % |
| ash | 6 wt % |
| sugars | 2.5 wt % |
| Glucose, glucose oligomers and dextrines | 37 wt % |
| pentosanes | 3.5 wt % |
| pectines | 0.5-2 wt % |
| polyphenols | 7-13 wt % |
| organic acid | 3-4 wt % |
| theobromine | 3 wt % |
| caffeine | 0.4 wt % |
| fosfatides | 0.8 wt % |

Table M illustrates an embodiment of the composition of a cocoa extract that can be used in a cocoa-derived composition according to the invention.

TABLE M

| Ingredient | Amount (in wt %) |
| --- | --- |
| Polyphenols | 60.5 |
| Protein | 9.5 |
| Carbohydrates | 12 |
| Theobromine | 7 |
| Caffeine | 1 |
| Moisture | 6.5 |
| Ashes | 3.5 |

Example 18

Ice Cream According to the Invention

Table N illustrates an embodiment of an ice-cream according to the invention. The ice cream in this example comprised 5 wt % of a cocoa powder as defined herein and having a solubility of 100% in water of less than 10° C., e.g. of 9OC.

Solubility of the cocoa powder as defined herein was measured by agitating or shaking at a temperature of 9° C., a sample of cocoa powder having an amount of 10 g with an amount of 90 g of water during 2 hours. Then the solution was filtered over a Whatmann filter with a pore size of 12 micrometers. After filtration nothing remained on the filter, meaning that the cocoa powder was 100% soluble.

TABLE N

| Ingredients | Weight % |
| --- | --- |
| Whole milk powder (fat content: 25% by weight based on the milk powder) | 10 |
| Glucose | 2.5 |
| Dextrose | 1.8 |
| Sucrose | 12.9 |
| Inverted sugar | 0.8 |
| Butter (100% fat) | 5.1 |
| Stabilizer (Lygomme ™) | 0.5 |
| Cocoa powder | 5.0 |
| Water | 61.4 |

The present ice cream was prepared by mixing milk powder, glucose, dextrose, sucrose and inverted sugar in a blender for about 5 minutes at room temperature to provide a dry blend. The resulting dry blend was then mixed with the butter and water for about 1-2 minutes until a dispersion was obtained. To the dispersion was then added 5 wt % of soluble cocoa powder as defined herein. The stabilizer was then added with constant mixing. While stirring, the mixture was heated to about 70° C. Then the resulting mixture was pasteurized at a room temperature of 70° C. to 80° C. for about 15 minutes. The pasteurized mixture was then homogenized in a mixer/blender at a speed of about 5000 rpm for about 5-10 minutes. The resultant homogenized mixture was then rapidly cooled to a temperature below 4° C. The mixture was aged by keeping the mixture at a temperature of about 4.5° C. in a refrigerator for at least 4 hours. The mixture was then frozen while being aerated and the resulting ice cream was packaged in plastic boxes. The ice cream was subjected to hardening in a hardening tunnel and stored at −40° C. for 6 hours. The ice cream was then moved to a storage room with a temperature of −20° C.

Example 19

Spoonability of Ice Cream According to the Invention Compared to a Control Ice Cream An ice cream according to the invention and a control ice cream were prepared. The control ice cream and the ice cream according to the invention only differed in the type of cocoa powder applied in the ice cream. In an ice cream according to the invention 6 wt % of a soluble cocoa powder as disclosed herein was used. The ice cream in this example comprised 6 wt % of a cocoa powder as defined herein and that has a solubility of 100% in water of less than 10° C., e.g. of 9° C. In a control ice cream 6 wt % of a conventional cocoa powder was used.

Solubility of the cocoa powder as defined herein was measured by agitating or shaking during at a temperature of 9° C., a sample of cocoa powder having an amount of 10 g with an amount of 90 g of water 2 hours. Then the solution was filtered over a Whatmann filter with a pore size of 12 micrometers. After filtration nothing remained on the filter, meaning that the cocoa powder was 100% soluble.

The solubility of the conventional cocoa powder used in the present experiment was between 10 and 15% in cold water, i.e. water of less than 10° C., e.g. of 9° C. Solubility of the conventional cocoa powder was measured in a same way as for the soluble cocoa powder. The ice creams prepared in this example were kept at −20° C. for 24 hours.

Figure 4:
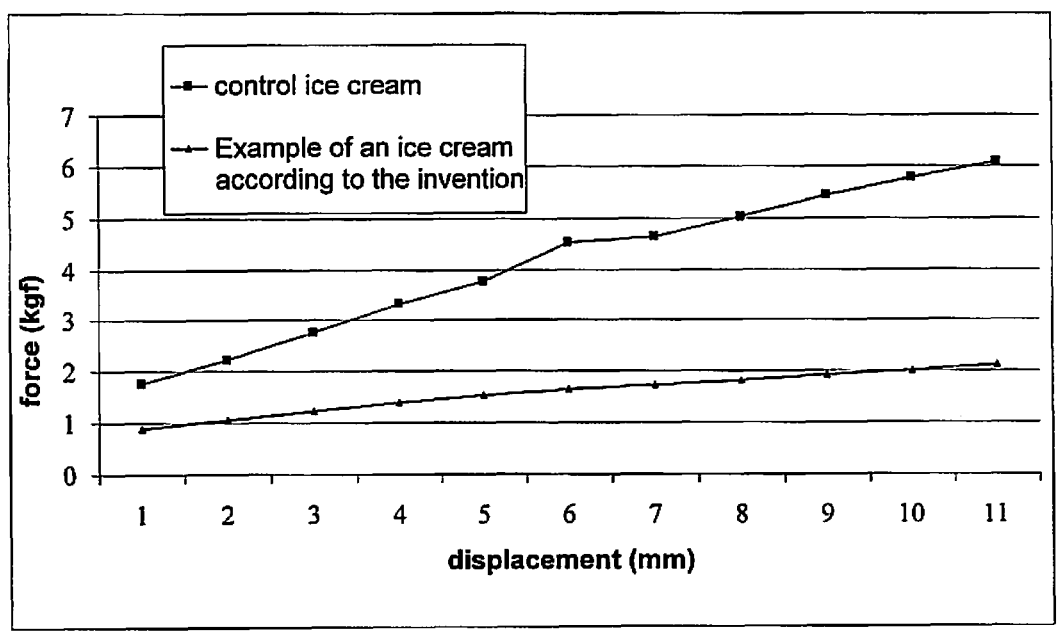
FIG. 4 represents the force that was applied for introducing a probe of a texture analyser in a control ice cream and in an ice cream according to the invention in function of probe penetration depth.

Hardness of the ice creams was subsequently measured using a texture analyzer, (Model TAPlus, LLOYD INSTRUMENTS, AMETEK Inc.) in a conventional way. Analyses were performed using this texture analyzer with a metal (iron) cylindrical probe having a round flat bottom surface with a diameter of 6.35 mm. Ice cream samples were quickly transported from the deep-freezer directly to the said texture analyzer, held at room temperature, and analyses were completed within 30 seconds to minimize variability due to sample warming. The stainless steel probe of the analyzer was aligned so that it touched the surface of the ice cream and then allowed to penetrate. The applied force, needed to push the probe into the ice cream, was measured and increased when going deeper into the ice cream. With respect to each sample, an average value of a hardness of a test sample was calculated according to 5 measurements. Results of this experiment are represented in FIG. 4.

It was found that when compared at the same temperature, the hardness of the ice cream produced according to the process of the present invention was remarkably lower than that of the control ice cream. Results of this experiment illustrate that when the probe reached a depth of 4 mm or more, more than two times more force (expressed in kgf in function of the penetration depth; 1 kg force≅10 Newton) is necessary to penetrate the control ice cream to the same depth. These results indicate that an ice cream according to the present invention has a lower hardness compared to a control ice cream and thus has improved spoonability compared to a control ice cream.

In addition, the Applicant has found that in this example overrun was higher for an ice cream according to the invention compared to the control ice cream. In particular, the overrun of the ice cream in this example was 34% compared to 26% for the control ice cream, under the measured test circumstances. Thus, the present ice cream has a higher overrun than control ice cream. Moreover, the ice cream according to the present invention has improved textural properties, and in particular a softer texture as it does not comprise powdery particles.

Example 20

Embodiment of an Ice Cream According to the Invention Compared to a Control Ice Cream In this example, another embodiment of an ice cream according to the invention and a control ice cream were prepared and compared to one another. The general composition of the control ice cream and the embodiment of the ice cream according the invention are represented in Table O. The control ice cream and the ice cream according to the invention differed in the type of cocoa powder applied in the ice cream. In the ice cream according to the invention 6.9 wt % of a soluble cocoa powder as disclosed herein was used, i.e. a cocoa powder that has a solubility of 100% in water of 10° C. In a control ice cream 6.9 wt % of a conventional cocoa powder was used. The solubility of this conventional cocoa powder was between 10 and 15% in cold water, i.e. water of 10° C.

TABLE O

| Ingredients | Weight % |
| --- | --- |
| Whole liquid milk | 69.2 |
| Glucose | 2.6 |
| Dextrose | 1.9 |
| Saccharose | 13.8 |
| Butter (100% fat) | 5.3 |
| Stabilizer (Lygomme ™) | 0.3 |
| Cocoa powder | 6.9 |

The ice creams were prepared by mixing the milk and the cocoa powder at room temperature and left to rest for 30 minutes. Then the melted butter and other ingredients were added. While stirring, the mixture was heated to about 65° C. Then the resulting mixture was pasteurized according to techniques known in the art at a temperature of 85° C. for about 30 seconds. The pasteurized mixture was then homogenized in a mixer/blender at a speed of about 5000 rpm for about 5-10 minutes. The resultant homogenized mixture was then rapidly cooled to a temperature below 4° C. The mixture was aged by keeping the mixture at a temperature of about 4.5° C. in a refrigerator for at least 3 hours. The mixture was then frozen for 24 hours.

After the cooling step the texture of the ice-cream mix according to the present invention was more fluid than the control ice cream mix.

Hardness of the finished ice creams was measured using a texture analyzer (Model TAPlus, LLOYD INSTRUMENTS, AMETEK Inc.) in a similar way as explained in example 2. The force that has to be applied to push the probe of this apparatus into the ice cream, was measured up to a depth of 12 mm. This force increased when going deeper into the ice cream.

It was found that when compared at the same temperature, the hardness of an ice cream according to the present invention was remarkably lower than that of a control ice cream. Results of this experiment illustrate that when the probe reached a depth of 2 mm or more, more than two times more force (expressed in Newton in function of the penetration depth; 10 Newton≅1 kg force), and when the probe reached a depth of 8 mm or more, more than three times more force (expressed in Newton in function of the penetration depth); is necessary to penetrate the control ice cream to the same depth. These results indicate that an ice cream according to the present invention has a lower hardness compared to a control ice cream and thus has improved spoonability compared to a control ice cream.

The invention claimed is:

1. A cocoa-derived material comprising a soluble cocoa powder and a cocoa extract, whereby said cocoa extract comprises polyphenols in an amount of more than 25% by weight based on the extract, and whereby said soluble cocoa powder can be produced by solubilizing between 50 and 100% (w/w) of a starting cocoa powder and wherein said soluble cocoa powder has a solubility in an aqueous solvent at a temperature of 20° C. of at least 70%, and wherein the weight ratio of soluble cocoa powder to cocoa extract in said material is comprised between 3:1 and 1:3.

2. Cocoa-derived material according to claim 1, whereby said soluble cocoa powder has a solubility in an aqueous solvent at a temperature of 20° C. of at least 90%.

3. Cocoa-derived material according to claim 1, wherein said cocoa extract is a solvent-derived extract and whereby said solvent is ethanol and water, acetone and water, 2-butanol and water or 2-propanol and water.

4. Cocoa-derived material according to claim 1, wherein said cocoa extract is obtained from non-defatted cocoa beans.

5. Cocoa-derived material according to claim 4, wherein said cocoa extract is obtained from non-fermented non-defatted cocoa beans.

6. A cocoa-derived material according to claim 1, wherein said material is a syrup.

7. Cocoa-derived material according to claim 6, having an oxygen radical absorbance capacity value of between 50 and 250 μmol trolox equivalents ("TE")/g syrup.

8. Cocoa-derived material a according to claim 1, wherein said material is in the form of granules, pellets, or a powder.

9. Cocoa-derived material according to claim 8, having an oxygen radical absorbance capacity value of between 10 and 10000 μmol trolox equivalents ("TE")/g powder.

10. Cocoa-derived beverage comprising between 0.01 and 30% by weight of a cocoa-derived material, and between 70 and 99.99% by weight of water, wherein said cocoa-derived material is as defined in claim 1.

11. Cocoa-derived beverage according to claim 10 having an oxygen radical absorbance capacity value of at least 1000 μmol trolox equivalents ("TE")/100 ml.

12. Beverage according to claim 10, comprising carbonated water and/or carbon gas.

13. Beverage according to claim 10, having an amount of polyphenols of at least 0.05% by weight.

14. Method for preparing a cocoa-derived beverage according to claim 11 comprising the steps of
   a) providing a cocoa-derived material according to claim 10, and
   b) admixing water to said cocoa-derived material under aseptic conditions, while optionally also adding other ingredients such as sugar and/or CO2.

15. The method of claim 14 further comprising the step:
   c) filling the mixture of step b) in suitable recipients.

* * * * *